(12) United States Patent
Medved et al.

(10) Patent No.: US 7,535,895 B2
(45) Date of Patent: May 19, 2009

(54) SELECTIVELY SWITCHING DATA BETWEEN LINK INTERFACES AND PROCESSING ENGINES IN A NETWORK SWITCH

(75) Inventors: Jan Medved, Pleasanton, CA (US); Alex Dadnam, San Ramon, CA (US); Sameer Kanagala, San Carlos, CA (US); Fong Liaw, Cupertino, CA (US); John Burns, Los Altos, CA (US); David Bumstead, San Jose, CA (US)

(73) Assignee: Hammerhead Systems, Inc., Mountain View, CA (US)

(*) Notice: Subject to any disclaimer, the term of this patent is extended or adjusted under 35 U.S.C. 154(b) by 925 days.

(21) Appl. No.: 10/447,825

(22) Filed: May 29, 2003

(65) Prior Publication Data

US 2004/0240470 A1 Dec. 2, 2004

(51) Int. Cl.
*H04J 3/16* (2006.01)
(52) U.S. Cl. .................. 370/360; 370/376; 370/467; 370/469
(58) Field of Classification Search ............. 370/469, 370/466, 471, 376, 907, 395.51
See application file for complete search history.

(56) References Cited

U.S. PATENT DOCUMENTS

| | | | | |
|---|---|---|---|---|
| 5,521,919 A | * | 5/1996 | Anderson et al. | 370/376 |
| 5,528,587 A | | 6/1996 | Galand et al. | 370/412 |
| 5,712,853 A | * | 1/1998 | Mathur et al. | 370/467 |
| 6,332,198 B1 | | 12/2001 | Simons et al. | 714/6 |
| 6,519,257 B1 | | 2/2003 | Brueckheimer et al. | |
| 6,891,836 B1 | * | 5/2005 | Chen et al. | 370/395.51 |
| 6,944,153 B1 | * | 9/2005 | Buckland et al. | 370/376 |
| 6,973,028 B1 | * | 12/2005 | Huai et al. | 370/222 |
| 7,130,276 B2 | | 10/2006 | Chen et al. | 370/249 |
| 7,184,440 B1 | * | 2/2007 | Sterne et al. | 370/395.52 |
| 2002/0049608 A1 | | 4/2002 | Hartsell et al. | |

(Continued)

FOREIGN PATENT DOCUMENTS

WO WO01/90843 11/2001

OTHER PUBLICATIONS

Patridge et al., A 50-Gb/s IP Router, IEEE, 12 pages, 1998.
James Aweya, IP Router Architectures: An Overview, Nortel Networks, 48 pages, 1999.

(Continued)

*Primary Examiner*—Chi H. Pham
*Assistant Examiner*—Shick Hom
(74) *Attorney, Agent, or Firm*—Van Pelt, Yi & James LLP

(57) ABSTRACT

Technology is disclosed for directing data through a network switch. One version of a network switch employs a mid-plane architecture that allows data to be directed between any link interface and any processing engine. Each time slot of data from an ingress link interface can be separately directed to any ingress processing engine. Each time slot of data from an egress processing engine can be separately directed to any egress link interface that supports the lower level protocol for the data. In one version of the switch, each processing engine in the network switch has the ability to service all of the protocols from the layers of the OSI model that are supported by the switch and not handled on the link interfaces. This allows the switch to allocate processing engine resources, regardless of the protocols employed in the data passing through the switch.

38 Claims, 13 Drawing Sheets

U.S. PATENT DOCUMENTS

2002/0116485 A1 8/2002 Black et al. .................. 709/223
2003/0236919 A1 12/2003 Johnson et al.
2004/0004961 A1 1/2004 Lakshmanamurthy et al.
2004/0240470 A1 12/2004 Medved et al. .............. 370/907
2007/0280223 A1* 12/2007 Pan et al. .................... 370/360

OTHER PUBLICATIONS

Kumagai et al., IP Router for Next-Generation Network, Fujitsu Sci. Tech, 11 pages, 2001.
Niraj Shah, Understanding Network Processor, Berkeley University, 93 pages, 2001.

* cited by examiner

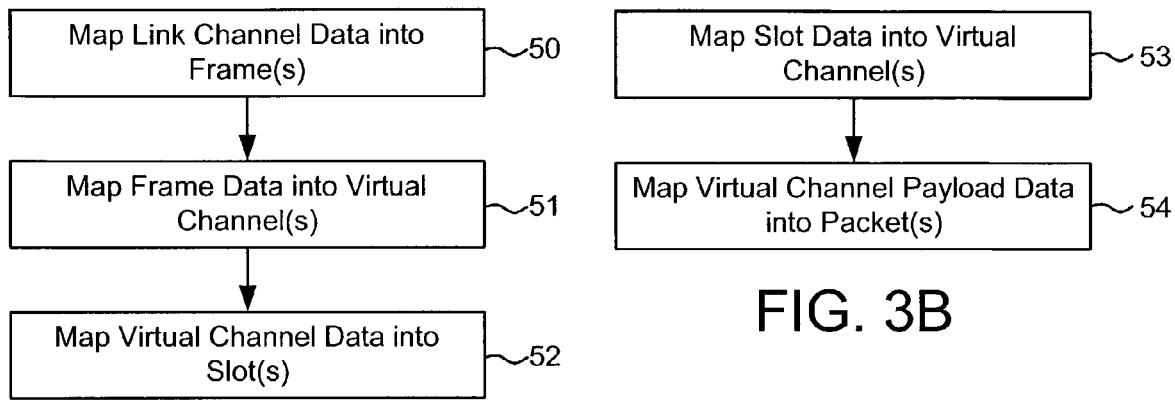
FIG. 3A
FIG. 3B
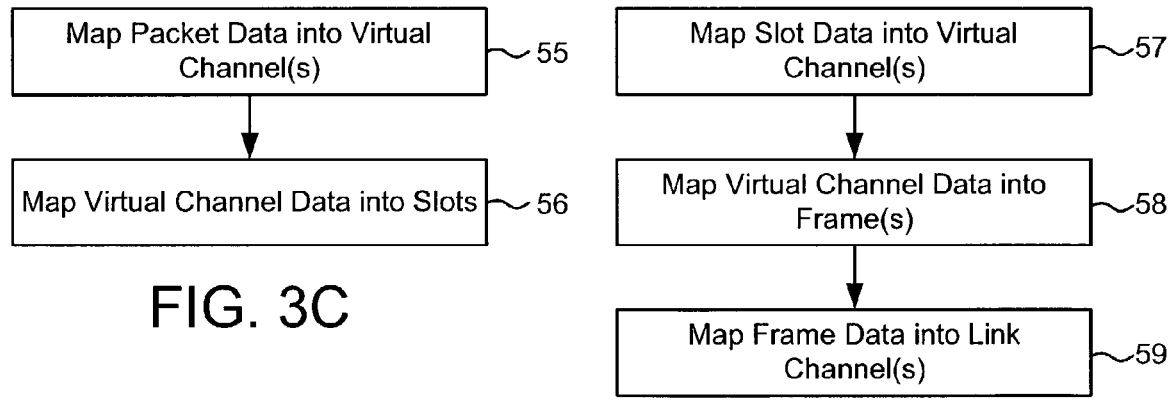
FIG. 3C
FIG. 3D

SELECTIVELY SWITCHING DATA BETWEEN LINK INTERFACES AND PROCESSING ENGINES IN A NETWORK SWITCH

BACKGROUND OF THE INVENTION

1. Field of the Invention

The present invention is directed to network switching technology.

2. Description of the Related Art

Network switches process data from an incoming port and direct it to an outgoing port. Network switches offer a variety of services, including support for virtual private networks ("VPNs"). The increased popularity of the Internet and other network related technologies has increased performance demands on network switches. Network switches need to efficiently manage their resources, while supporting multiple physical signaling standards and higher-level protocols.

A typical network switch includes link interfaces for exchanging data with physical signaling mediums. The mediums carry data according to multiple physical signaling protocols. Each link interface supports a physical signaling standard from the physical layer (Layer 1) of the Open Systems Interconnection ("OSI") model. In one example, a link interface supports a network connection for Synchronous Optical Network ("SONET") at Optical Carrier level 48 ("OC-48"). In another example, a link interface supports the physical layer of Gigabit Ethernet. Some link interfaces also support portions of the data-link layer (Layer 2) in the OSI model, such as the Media Access Control ("MAC") of Gigabit Ethernet.

Incoming data also conforms to one or more higher-level protocols, such as High-level Data Link Control ("HDLC"), Point-to-Point Protocol ("PPP"), Frame Relay, Asynchronous Transfer Mode ("ATM"), and other protocols in higher layers of the OSI model. Each link interface forwards incoming data to a processing engine in the network switch that supports a higher-level protocol for the data—a network switch may have one or multiple processing engines. The processing engine interprets the data and performs any desired processing, such as packet processing according to one or more layers in the OSI model. A variety of different processing operations can be performed, based on the services supported in the network switch.

The processing engine identifies an egress link interface for incoming data and arranges for the data to be forwarded to the egress link interface. The egress link interface delivers the data to a desired network medium connection. In network switches with multiple processing engines, an ingress processing engine directs the data through an egress processing engine for forwarding to the egress link interface.

Network switches can be implemented as either single card or multiple card systems. A single card system implements all of the switch's link interfaces and processing engines on a single printed circuit board ("PCB"). These types of systems are typically simple switches with the link interfaces being directly connected to a single processing engine. If multiple processing engines are employed, each processing engine is typically connected to a fixed set of link interfaces. The processing engines are also coupled to a fabric or interconnect mesh for exchanging data with each other. The connections between a set of link interfaces and a processing engine cannot be altered, regardless of the level of traffic through the link interfaces. This can result in an inefficient use of system resources—one processing engine can be over utilized, while another processing engine is under utilized. The fixed relationship between link interfaces and processing engines does not permit incoming link interface traffic to be redirected to a processing engine with excess resources.

Multiple card network switches implement link interface functionality and processing engine functionality on multiple PCBs—allowing the network switch to support more link interfaces and processing engines than a single card switch. Two types of multiple card systems are the backplane architecture and the mid-plane architecture.

In the backplane architecture, multiple line cards are coupled together over a backplane. A line card includes a processing engine coupled to one or more link interfaces for interfacing to physical mediums. Multiple line cards are coupled to the backplane. Incoming data is switched from an ingress line card to an egress line card for transmission onto a desired network medium. One type of backplane architecture includes a fabric card coupled to the backplane for facilitating the transfer of data between line cards.

The backplane architecture also fails to efficiently allocate system resources. The relationship between link interfaces and processing engines is fixed. Each processing engine resides on a line card with its associated link interfaces. The processing engine can only communicate with link interfaces on its line card. Incoming traffic through the link interfaces on one card can be very heavy. None of this traffic can be directed to a processing engine on another line card for ingress processing. This is wasteful if processing engines on other cards have excess resources available.

In the mid-plane architecture, multiple cards are coupled to a mid-plane that facilitates communication between the cards. The switch includes processing engine cards and link interface cards. Each processing engine card includes a processing engine, and each link interface card has one or more link interfaces. One type of link interface typically performs processing on data at Layer 1 of the OSI model. Each processing engine card processes data at Layer 2 in the OSI model and higher. A processing engine card provides only one type of Layer 2 processing—requiring the switch to contain at least one processing engine card for each type of Layer 2 protocol supported in the switch. In some instances, link interfaces perform a portion of the Layer 2 processing, such as Gigabit Ethernet MAC framing. Another type of link interface only performs a portion of the Layer 1 processing—operating only as a transceiver. In this implementation, the processing engine card also performs the remaining portion of the Layer 1 processing. Each processing engine card only supports one type of Layer 1 protocol—requiring the switch to contain at least one processing engine card for each type of Layer 1 protocol supported in the switch.

In operation, an ingress link interface card forwards incoming data to an ingress processing engine card. The ingress processing engine card is dedicated to processing data according to the higher-level protocol employed in the incoming data. The ingress processing engine passes the processed incoming data to an egress processing engine card for further processing and forwarding to an egress link interface card. In one implementation, the switch includes a fabric card for switching data from one processing engine card to another processing engine card.

One type of mid-plane switch passes data between link interface cards and processing engine cards over fixed traces in the mid-plane. This creates the same inefficient use of system resources explained above for the single card architecture and backplane architecture.

Another type of mid-plane switch employs a programmable connection card to direct data between link interface cards and processing engine cards. Each link interface card has one or more serial outputs for ingress data coupled to the connection card and one or more serial inputs for egress data coupled to the connection card. Each processing engine card has one or more serial outputs for egress data coupled to the connection card and one or more serial inputs for ingress data coupled to the connection card. For each link interface card output, the connection card forms a connection with one processing engine card input for transferring data. For each processing engine card output, the connection card forms a connection with one link interface card input for transferring data. Data from one card output cannot be directed to multiple card inputs through the connection card.

Even with the connection card, the mid-plane architecture wastes resources. Protocol specific processing engine cards can be wasteful. If the network switch receives a disproportionately large percentage of data according to one protocol, the processing engine supporting that protocol is likely to be over utilized. Meanwhile, processing engine cards for other protocols remain under utilized with idle processing bandwidth. The resource inefficiency of existing mid-plane systems is worse when a switch includes redundant processing engine cards. The network switch requires at least one redundant processing engine card for each protocol supported in the network switch, regardless of the protocol's utilization level.

SUMMARY OF THE INVENTION

The present invention, roughly described, pertains to technology for efficiently utilizing resources within a network switch. One implementation of a network switch employs a mid-plane architecture that allows data to be directed between any link interface and any processing engine. In one implementation, each link interface can have a single data stream or a channelized data stream. Each channel of data from a link interface can be separately directed to any processing engine. Similarly, each channel of data from a processing engine can be separately directed to any link interface. In one embodiment, each processing engine in the network switch has the ability to service all of the protocols from the layers of the OSI model that are supported by the switch and not handled on the link interfaces. This allows the switch to allocate processing engine resources, regardless of the protocols employed in the data passing through the switch.

One embodiment of the network switch includes link interfaces, processing engines, a switched fabric between the processing engines, and a switch between the link interfaces and processing engines. In one implementation, the switch between the link interfaces and processing engines is a time slot interchange ("TSI") switch. An ingress link interface receives incoming data from a physical signaling medium. The ingress link interface forwards incoming data to the TSI switch. The TSI switch directs the data to one or more ingress processing engines for processing, such as forwarding at the Layer 2 or Layer 3 level of the OSI model. In one implementation, the TSI switch performs Time Division Multiplexing ("TDM") switching on data received from each link interface—separately directing each time slot of incoming data to the proper ingress processing engine. In an alternate embodiment, the TSI switch is replaced by a packet switch. The information exchanged between link interfaces and processing engines is packetized and switched through the packet switch.

The ingress processing engine sends data to the packet switch fabric, which directs packets from the ingress processing engine to one or more egress processing engines for further processing and forwarding to the TSI switch. The TSI switch directs the data to one or more egress link interfaces for transmission onto a physical medium. One implementation of the TSI switch performs TDM switching on data streams received from each processing engine—separately directing each time slot of incoming data to the proper egress link interface. In an alternate embodiment, the TSI switch is replaced by a packet switch that performs packet switching.

The switch between the link interfaces and processing engines can be any multiplexing switch—a switch that multiplexes data from multiple input interfaces onto a single output interface and demultiplexes data from a single input interface to multiple output interfaces. The above-described TSI switch and packet switch are examples of a multiplexing switch.

In one example, the TSI switch receives data from link interfaces and processing engines in the form of SONET STS-48 frames. The TSI switch has the ability to switch time slots in the SONET frame down to the granularity of a single Synchronous Transport Signal—1 ("STS-1") channel. In alternate embodiments, the TSI switch can switch data at a higher or lower granularity. Further implementations of the TSI switch perform virtual concatenation—switching time slots for multiple STS-1 channels that operate together as a higher throughput virtual channel, such as a STS-3 channel.

The operation of the TSI switch and protocol independence of the processing engines facilitates bandwidth pooling within the network switch. When a processing engine becomes over utilized, a channel currently supported by the processing engine can be diverted to any processing engine that is not operating at full capacity. This redirection of network traffic can be performed at the STS-1 channel level or higher. Similar adjustments can be made when a processing engine or link interface are under utilized. Bandwidth pooling adjustments can be made when the network switch is initialized and during the switch's operation. The network switch also provides efficient redundancy—a single processing engine can provide redundancy for many other processing engines, regardless of the protocols embodied in the underlying data. Any processing engine can be connected to any channel on any link interface—allowing any processing engine in the network switch to back up any other processing engine in the switch. This easily facilitates the implementation of 1:1 or 1:N processing engine redundancy. In one implementation, the efficient distribution of resources allows for a 2:1 ratio of link interfaces to processing engines, so that each link interface has redundancy and no processing engine is required to sit idle.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors, including microcontrollers and other programmable logic. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 3A is a flowchart depicting one embodiment of a process for mapping link channel data into virtual channel slots.

FIG. 3B is a flowchart depicting one embodiment of a process for extracting payload packets.

FIG. 3C is a flowchart depicting one embodiment of a process for mapping packet data into virtual channel slots.

FIG. 3D is a flowchart depicting one embodiment of a process for mapping virtual channel slot data into link channels.

DETAILED DESCRIPTION

Figure 1:
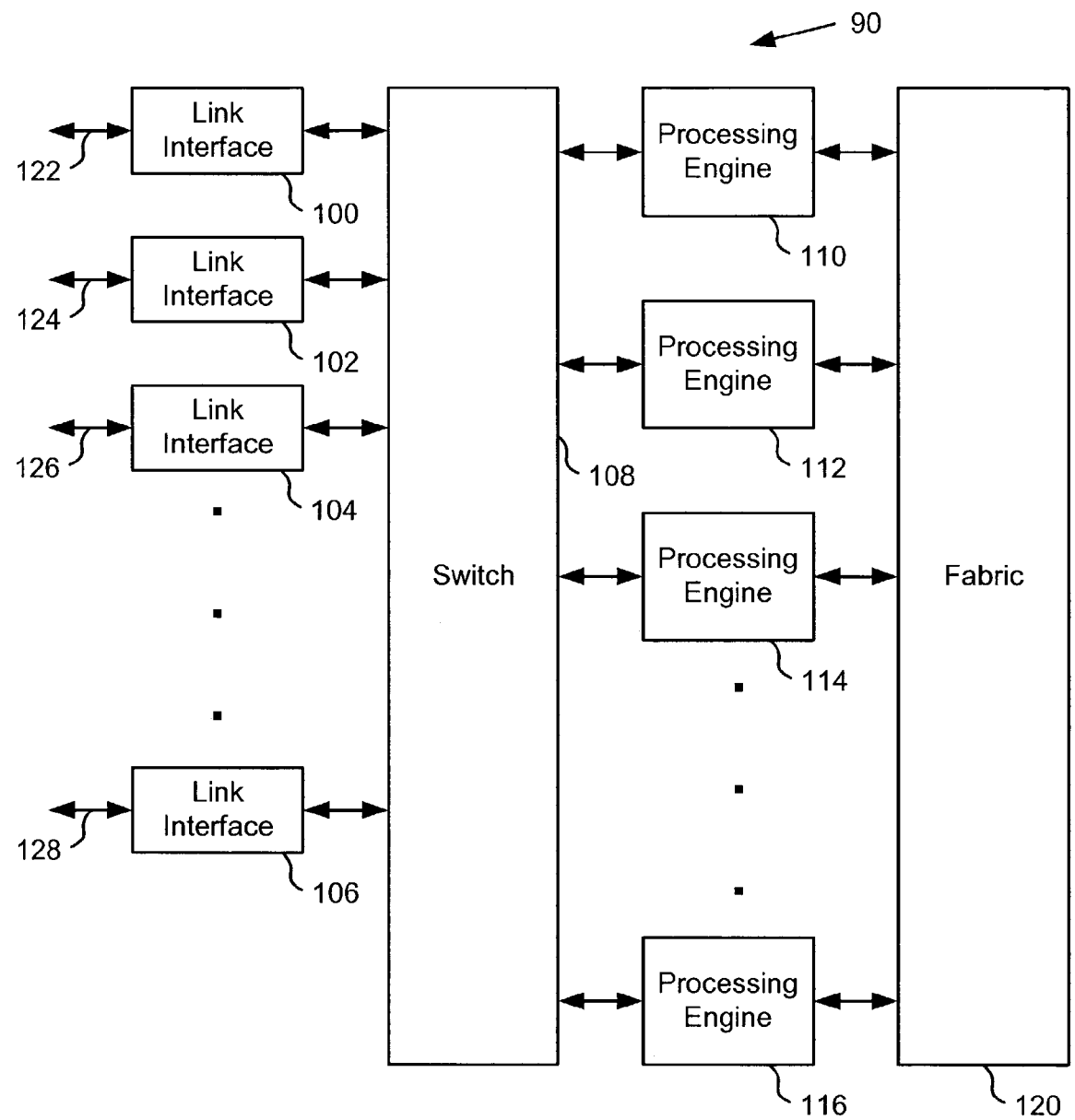
FIG. 1 is a block diagram depicting one embodiment of a network switch in accordance with the present invention.

FIG. 1 is a block diagram depicting one embodiment of network switch 90 in accordance with the present invention. Network switch 90 implements a mid-plane architecture to switch packets between multiple signaling mediums. Switch 90 supports multiple physical layer protocols in Layer 1 of the OSI model. Switch 90 also supports one or more higher-level protocols corresponding to Layer 2, Layer 3, and above in the OSI model. Switch 90 provides networking services that control the flow of data through switch 90.

Switch 90 can be any type of network switch in various embodiments. In one embodiment, switch 90 is a network edge switch that provides Frame Relay, Gigabit Ethernet, Asynchronous Transfer Mode ("ATM"), and Internet Protocol ("IP") based services. In one example, switch 90 operates as a Provider Edge ("PE") Router implementing a virtual private network—facilitating the transfer of information between Customer Edge Routers that reside inside a customer's premises and operate as part of the same virtual private network. In another embodiment, switch 90 is a network core switch that serves more as a data conduit.

FIG. 1 shows that switch 90 has a mid-plane architecture that includes link interfaces 100, 102, 104, and 106, processing engines 110, 112, 114, and 116, switch 108, and fabric 120. In different embodiments, switch 90 can include more or less link interfaces and processing engines. In one embodiment, switch 90 includes 24 link interfaces and 12 processing engines. The link interfaces and processing engines are coupled to switch 108, which switches data between the link interfaces and processing engines. The processing engines are also coupled to fabric 120, which switches data between processing engines. In one implementation, fabric 120 is a switched fabric that switches packets between processing engines. In an alternative implementation, fabric 120 is replaced with a mesh of mid-plane traces with corresponding interfaces on the processing engines.

During ingress, data flows through an ingress link interface to switch 108, which switches the data to an ingress processing engine. In one implementation, switch 108 is a multiplexing switch, such as a time slot based switch or packet based switch. The ingress processing engine processes the data and forwards it to an egress processing engine through fabric switch 120. In one implementation, the ingress processing engine employs Layer 2 and Layer 3 lookups to perform the forwarding. The egress processing engine performs egress processing and forwards data to switch 108. Switch 108 switches the data to an egress link interface for transmission onto a medium. More details regarding the ingress and egress flow of data through switch 90 are provided below with reference to FIGS. 2A, 2B, 6, and 7.

Each link interface exchanges data with one or more physical networking mediums. Each link interface exchanges data with the mediums according to the Layer 1 physical signaling standards supported on the mediums. In some embodiments, a link interface also performs a portion of Layer 2 processing, such as MAC framing for Gigabit Ethernet.

In one example, link interfaces 100 and 106 interface with mediums 122 and 128, respectively, which carry STS-48 SONET over OC-48; link interface 102 interfaces with medium 124, which carries channelized SONET over OC-48, such as 4 STS-12 channels; and link interface 104 interfaces with medium 126, which carries Gigabit Ethernet. In various embodiments, many different physical mediums, physical layer signaling standards, and framing protocols can be supported by the link interfaces in switch 90.

The processing engines in switch 90 deliver the services provided by switch 90. In one implementation, each processing engine supports multiple Layer 2, Layer 3, and higher-level protocols. Each processing engine in switch 90 processes packets or cells in any manner supported by switch 90—allowing any processing engine to service data from any medium coupled to a link interface in switch 90. In one embodiment, processing engine operations include Layer 2 and Layer 3 switching, traffic management, traffic policing, statistics collection, and operation and maintenance ("OAM") functions.

In one implementation, switch 108 is a TSI switch that switches data streams between the link interfaces and processing engines. In one embodiment, TSI switch 108 switches time slots of data between link interfaces and processing engines. In one implementation, each time slot can support a single STS-1 channel. One version of TSI switch 108 interfaces with link interfaces and processing engines through TSI switch ports. During ingress, an ingress link interface maps incoming data into a set of time slots and passes the set of time slots to an incoming TSI switch port in TSI switch 108. In one implementation, TSI switch 108 supports an incoming set of time slots with 48 unique slots, each capable of carrying bandwidth for an STS-1 channel of a SONET frame. In one such embodiment, TSI switch 108 receives the incoming set of time slots on an incoming TSI switch port. In different embodiments, different time slot characteristics can be employed. TSI switch 108 switches the received time slots into outgoing time slots for delivery to ingress processing engines. TSI switch 108 delivers outgoing time slots for each ingress processing engine through an outgoing TSI switch port associated with the respective ingress processing engine.

During egress, an egress processing engine maps egress data into time slots and passes the time slots to TSI switch 108, which receives the time slots into an incoming TSI switch port. TSI switch 108 maps the received time slots into outgoing time slots for delivery to egress link interfaces through outgoing TSI switch ports. In one implementation, TSI switch 108 includes the following: (1) an incoming TSI switch port for each ingress link interface and each egress processing engine, and (2) an outgoing TSI switch port for each ingress processing engine and each egress link interface. When a link interface or processing engine performs both ingress and egress operations, TSI switch 108 includes an incoming TSI switch port and an outgoing TSI switch port for the link interface or processing engine.

In one implementation, TSI switch 108 performs time division multiplexing. TSI switch 108 is capable of switching a time slot in any incoming set of time slots to any time slot in any outgoing set of time slots. Any time slot from a link interface can be delivered to any processing engine. Any time slot from a processing engine can be delivered to any link interface that supports the protocol for the time slot's data. This provides a great deal of flexibility when switching data between link interfaces and processing engines—allowing data to be switched so that no processing engine or link interface becomes over utilized while others remain under utilized.

In an alternate embodiment, switch 108 is a packet switch. In this embodiment, the link interfaces and processing engines deliver data to packet switch 108 in the form of packets with headers. Packet switch 108 uses the headers to switch the packets to the appropriate link interface or processing engine.

Figure 2A:
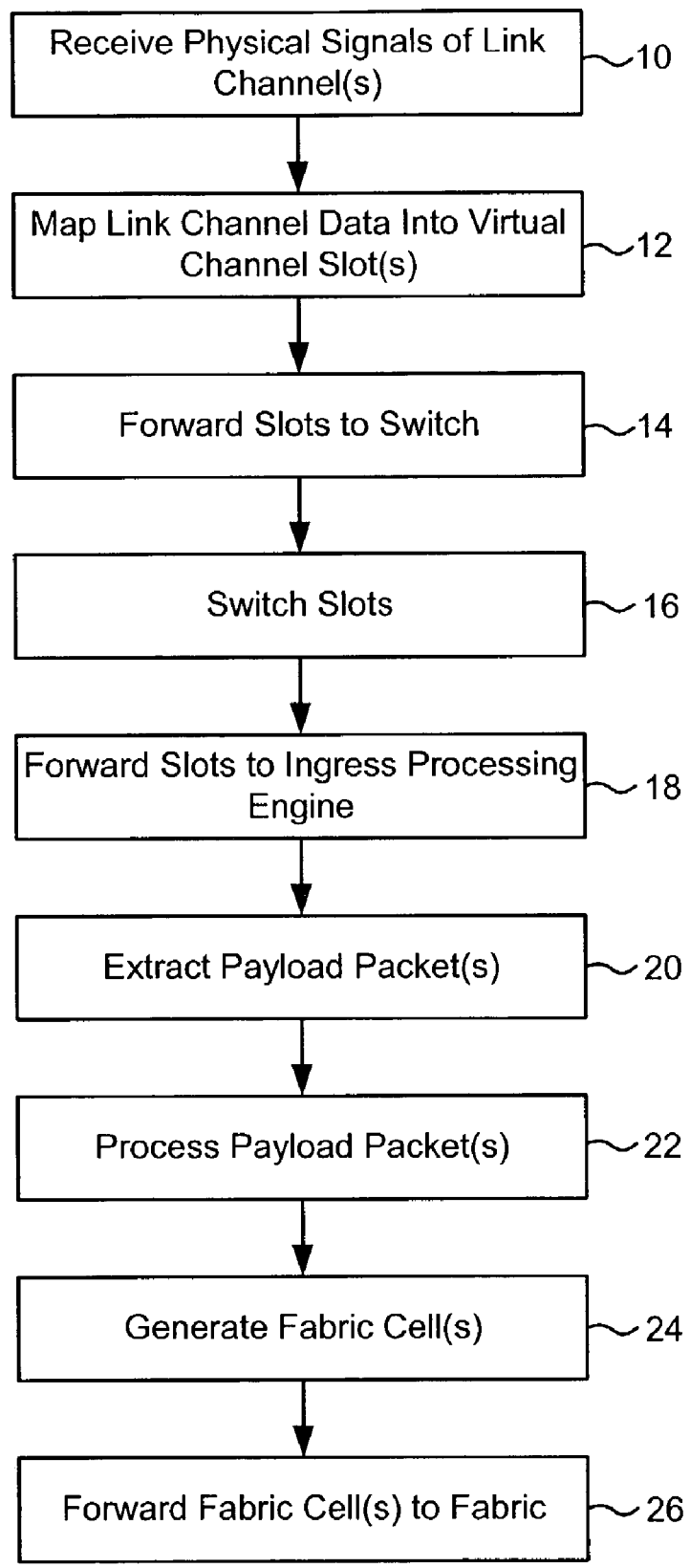
FIG. 2A is a flowchart depicting one embodiment of a process for the ingress flow of data through a network switch.

FIG. 2A is a flowchart depicting one embodiment of a process for the ingress flow of data through network switch 90 when switch 108 is a TSI switch. An ingress link interface, such as link interface 100, 102, 104, or 106, receives physical signals over a medium, such as link 122 (step 10). The physical signals conform to a physical signaling standard from Layer 1 of the OSI model. In one implementation, each link interface includes one or more transceivers to receive the physical signals on the medium in accordance with the Layer 1 protocol governing the physical signaling. Different link interfaces in network switch 90 can support different Layer 1 physical signaling standards. For example, some link interfaces may support OC-48 physical signaling, while other link interfaces support physical signaling for Gigabit Ethernet. The reception process (step 10) includes the Layer 1 processing necessary to receive the data on the link.

In one implementation, each link supported by a link interface includes one or more channels. In one example, link 122 is an OC-48 link carrying 4 separate STS-12 channels. In different embodiments, a link can have various channel configurations. A link can also carry only a single channel of data. For example, link 122 can be an OC-48 link with a single STS-48 channel.

The ingress link interface maps data from incoming link channels into virtual channel time slots in switch 90 (step 12). As described above, one embodiment of switch 90 employs TSI switch 108 to pass data from ingress link interfaces to ingress processing engines. Each ingress link interface maps data from link channels to time slots that are presented to TSI switch 108 for switching. In one embodiment, each link interface maps link channel data into a set of 48 time slots for delivery to TSI switch 108.

Switch 90 employs virtual concatenation of time slots to form virtual channels within switch 90. Each time slot is assigned to a virtual channel. In some instances, multiple time slots are assigned to the same virtual channel to create a single virtual channel with increased bandwidth. In one example, each time slot has the ability to support bandwidth for a STS-1 channel of data. When a single time slot is assigned to a virtual channel, the virtual channel is an STS-1 channel. When multiple time slots are assigned to the same virtual channel, the resulting virtual channel operates as a single channel with the bandwidth of a single STS-X channel—X is the number of time slots assigned to the virtual channel. When multiple time slots are assigned to a single virtual channel there is no requirement for the assigned time slots to be adjacent to one another. However, the time slots can be adjacent in some embodiments. In further embodiments, time slots can support a channel bandwidth other than a STS-1 channel.

In various embodiments, different techniques can be employed for mapping link channel data into virtual channel time slots. In one example, a link includes 4 STS-12 channels, and the ingress link interface coupled to the link supports 4 STS-12 virtual channels—4 virtual channels each being assigned 12 time slots with STS-1 bandwidth. In this example, the ingress link interface maps data from each STS-12 link channel to a respective one of the 4 STS-12 virtual channels. FIG. 3A shows a process that employs Layer 2 framing before mapping link channel data into virtual channel time slots. More details regarding FIG. 3A are provided below.

The ingress link interface forwards the set of time slots to TSI switch 108 (step 14). In one implementation, each ingress link interface supports a set of 48 time slots, and TSI switch 108 receives a set of 48 time slots from each ingress link interface. In this embodiment, each ingress link interface forwards the set of 48 time slots to TSI switch 108 in the form of GFP framed data over SONET. In alternate embodiments, switch 90 employs different numbers of time slots and different methods of forwarding time slots to TSI switch 108.

TSI switch 108 switches the incoming time slots from ingress link interfaces to outgoing time slots for delivery to ingress processing engines (step 16). TSI switch 108 forwards sets of outgoing time slots to their respective ingress processing engines (step 18). There is an outgoing set of time slots associated with each ingress processing engine coupled to TSI switch 108. TSI switch 108 maps each incoming time slot from an ingress link interface to a time slot in an outgoing set of time slots for an ingress processing engine. TSI switch 108 has the ability to direct any incoming time slot of data from a link interface to any processing engine on any time slot in any outgoing set of time slots.

TSI switch 108 can map time slot data from an incoming set of time slots to time slots in multiple outgoing sets of time slots—a first time slot in an incoming set of time slots can be mapped to a time slot in one outgoing set of time slots and a second time slot in the incoming set of time slots can be mapped to a time slot in a different outgoing set of time slots. TSI switch 108 can also map time slots from different incoming sets of time slots to time slots in the same outgoing set of time slots—a time slot in a first incoming set of time slots can be mapped to a time slot in an outgoing set of time slots and a time slot in a different incoming set of time slots can be mapped to a time slot in the same outgoing set of time slots.

In one implementation, each ingress processing engine is assigned 48 outgoing time slots. TSI switch 108 maps the data from each incoming time slot to one of the 48 time slots for one of the ingress processing engines. TSI switch 108 forwards each outgoing set of 48 time slots to a respective ingress processing engine in the form of GFP framed data over SONET. In alternate implementations, an outgoing set of time slots can have a different format than the incoming set of time slots. More details regarding the mapping performed by TSI switch 108 appears below.

An ingress processing engine, such as processing engines 110, 112, 114, or 116, receives an outgoing set of time slots from TSI switch 108 and extracts payload data packets (step 20). The payload data is the data carried within each virtual channel. An ingress processing engine extracts the payload data and maps the data into packets that can be processed according to the protocols supported on the processing engine. In one implementation, one or more processing engines each support multiple protocols within each layer of the OSI model. In another implementation, one or more processing engines each support all protocols supported by the processing engines in switch 90 within each layer of the OSI model supported on the processing engines. These implementations allow an ingress processing engine to perform different processing on data from each of the virtual channels received via the outgoing set of time slots from TSI switch 108. In yet another embodiment, a processing engine does not support multiple protocols within each layer of the OSI model. Further details regarding the extraction of payload data are provided below with reference to FIG. 3B.

The ingress processing engine processes the extracted payload data packets according to the identified protocol for the data (step 22). Payload data received from one time slot may require different processing than payload data received from a different time slot. In one embodiment, the ingress processing engine performs data processing at Layer 2 and Layer 3 of the OSI model. In further embodiments, the ingress processing engine may perform processing at Layer 2, Layer 3 and above in the OSI model.

The ingress processing engine generates fabric cells for delivering processed data to an egress processing engine through fabric 120 (step 24). In one implementation, the ingress processing engine generates fabric cells by breaking the payload data associated with processing packets into smaller cells that can be forwarded to fabric 120. Various fabric cell formats can be employed in different embodiments. The ingress processing engine formats the cells according to a standard employed for delivering cells to fabric 120. Those skilled in the art will recognize that many different well-known techniques exist for formatting fabric cells. The ingress processing engine forwards the fabric cells to fabric 120 (step 26).

Figure 2B:
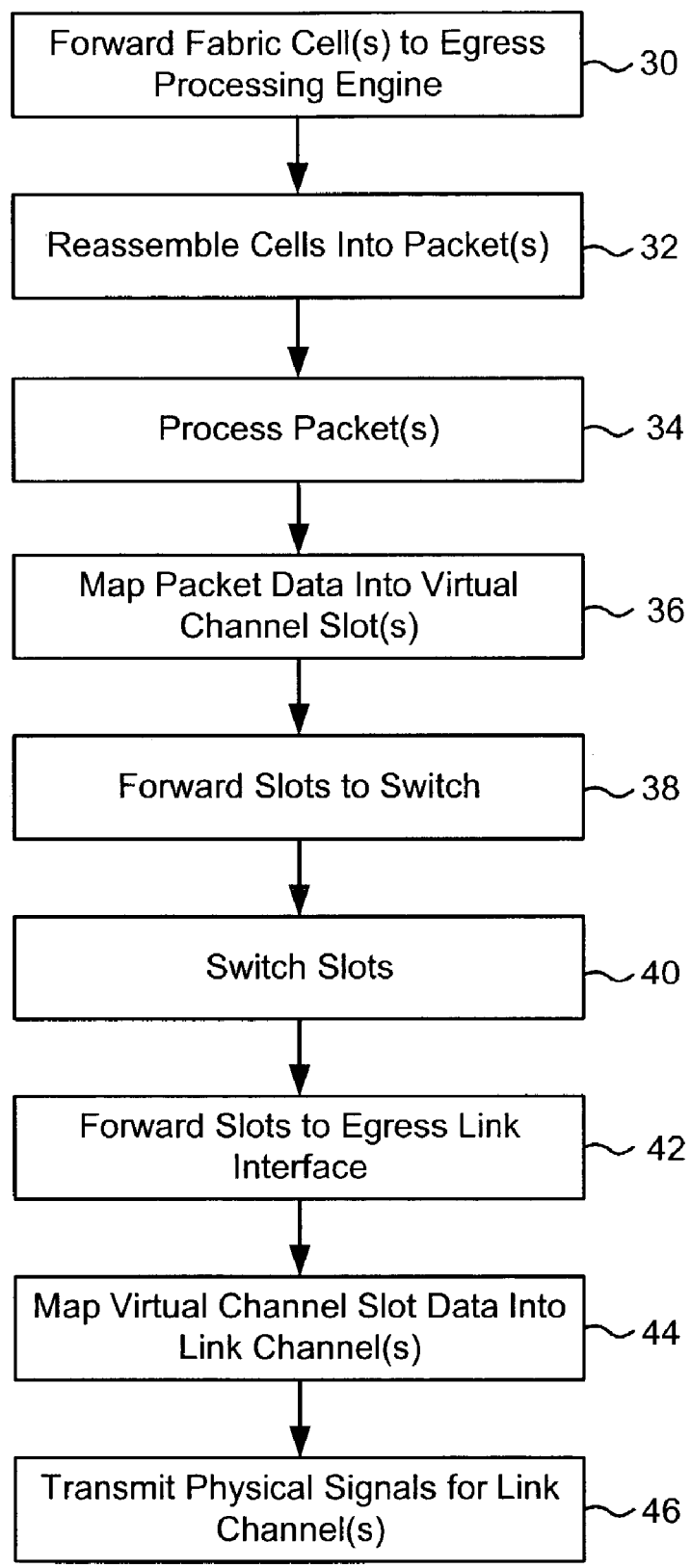
FIG. 2B is a flowchart depicting one embodiment of a process for the egress flow of data through a network switch.

FIG. 2B is flowchart depicting one embodiment of a process for the egress flow of data through network switch 90 when switch 108 is a TSI switch. Fabric 120 forwards fabric cells to an egress processing engine, such as processing engine 110 and 112, 114, or 116 (step 30). The egress processing engine reassembles the fabric cells into one or more processing packets of data (step 32). The egress processing engine processes the packets according to the appropriate OSI model protocols. In one implementation, the egress processing engine performs Layer 2 and Layer 3 processing. In alternate implementations, there is no need for packet processing on the egress processing engine.

The egress processing engine maps processing packet data into virtual channel slots (step 36) and forwards the virtual channel slots to TSI switch 108 (step 38). On each egress processing engine, each virtual channel is represented by one or more time slots in a set of time slots. In one embodiment, each time slot can support the bandwidth of a STS-1 channel. In one implementation, the set of time slots includes 48 time slots, and the egress processing engine forward the 48 time slots to TSI switch 108 in the form of GFP framed data over SONET. In alternate embodiments, different time slot sizes can be employed and different mechanisms can be employed for forwarding sets of time slots. More details regarding the mapping of packet data into virtual channel slots is provided below with reference to FIG. 3C.

TSI switch 108 switches the incoming set of time slots from each egress processing engine (step 40). TSI switch 108 maps each time slot in an incoming set of time slots into a time slot in an outgoing set of time slots for delivery to an egress link interface. This mapping process is the same as described above for mapping data from ingress link interface time slots into outgoing sets of time slots for ingress processing engines (step 16, FIG. 2A). TSI switch 108 is capable of mapping any time slot from an egress processing engine set of time slots to any time slot of any outgoing set of time slots for any egress link interface. TSI switch 108 forwards outgoing sets of time slots to the appropriate egress link interfaces (step 42). In one implementation, an outgoing set of slots is in the form of GFP framed data over SONET. Different forwarding formats and time slot sizes can be employed in various embodiments.

An egress link interface that receives an outgoing set of time slots from TSI switch 108 maps virtual channel slot data into link channels (step 44). FIG. 3D shows a flowchart for one method of carrying out step 44 by framing virtual channel data and mapping the framed data into link channels. In alternate embodiments, different techniques can be employed to carryout step 44. The egress link interface transmits the physical signals for data in each link channel as physical signals on the medium coupled to the link interface (step 46). The link interface transmits the frames according to the Layer 1 signaling protocol supported on the medium.

FIG. 3A is a flowchart describing one embodiment of a process for mapping link channel data into virtual channel slots (step 12, FIG. 2A). The ingress link interface maps link channel data into frames (step 50). In one implementation, the ingress link interface performs Layer 2 processing on incoming link data to create Layer 2 frames. In alternate embodiments, different protocol rules can be employed to generate frames from link channel data. In one embodiment, switch 90 maintains mapping tables that are used by ingress processing engines to map link channel data into frames.

One implementation of the table contains entries with the following fields: 1) Link Channel—identifying a link channel for the ingress processing engine; 2) Protocol—identifying a Layer 1 and Layer 2 protocol for the identified link channel; and 3) Frame—identifying one or more frames to receive data from the identified link channel. When data arrives at an ingress link interface, the link interface uses the table entry that corresponds to the link channel supplying the data. The ingress link interface maps the data into the identified frames using the identified Layer 1 and Layer 2 protocols. Each link channel can be programmed for a different Layer 1 and/or Layer 2 protocol. A user of switch 90 programs the fields in the above-identified table in one embodiment. In further embodiments, different fields can be employed and mechanisms other than a mapping table can be employed.

The ingress processing engine maps the frame data into virtual channels (step 51) and maps the virtual channel's data into time slots in a set of time slots the link interface will forward to TSI switch 108 (step 52). In one implementation, these steps are performed as separate operations. In alternate implementations, these steps are combined into a single step.

In one embodiment, network switch 90 maintains mapping tables that are used by the ingress link interface to map incoming data into virtual channels and virtual channel data into a set of time slots. In one implementation, the table contains entries with the following fields: 1) Virtual Channel—identifying a virtual channel; 2) Time Slots—identifying all time slots in the ingress link interface's set of time slots that belong to the identified virtual channel; 3) Link Channel—identifying one or more link channels that are to have their data mapped into the identified virtual channel; and 4) Link Channel Protocol—identifying the Layer 1 and Layer 2 protocols employed for the data in the identified link channels. In one implementation, the Link Channel field can identify one or more frames formed as a result of step 50. Alternatively, different information can be used to identify link channel data for a virtual channel when the ingress link interface does not frame link channel data. A user of switch 90 programs these fields in one embodiment. In further embodiments, different fields can be employed and mechanisms other than a mapping table can be employed.

The ingress link interface uses a table entry to map data into a virtual channel. The ingress link interface maps data from the entry's identified link channel into the entry's identified time slots for the virtual channel. The ingress link interface formats the link channel data in the virtual channel time slots, based on the entry's identified Layer 1 and Layer 2 protocols for the link channel data.

FIG. 3B is a flowchart describing one embodiment of a process for extracting payload packets (step 20, FIG. 2A). The egress processing engine maps data from each time slot received from TSI switch 108 into a virtual channel (step 53) and maps data from the virtual channel into one or more payload data packets for processing (step 54). In one implementation, these steps are performed as separate operations. In alternate implementations, these steps are combined into a single step.

In one embodiment, network switch 90 maintains mapping tables that are used by the ingress processing engine to map incoming slot data to packets for processing by the ingress processing engine. In one implementation, the table contains an entry for each virtual channel. Each entry includes the following fields: 1) Virtual Channel—identifying a virtual channel; 2) Time Slots—identifying all time slots in the ingress processing engine's set of time slots that belong to the identified virtual channel; 3) Link Channel—identifying one or more link channels that are to have their data mapped into the identified virtual channel; and 4) Link Channel Protocol—identifying the Layer 1 and Layer 2 protocols employed for the data in the identified link channels. A user of switch 90 programs these fields in one embodiment. In further embodiments, different fields can be employed and mechanisms other than a mapping table can be employed.

The ingress processing engine uses this table to extract payload data into packets for processing. When each time slot of data arrives at the ingress processing engine, the ingress processing engine associates the time slot with a virtual channel in an entry corresponding to the time slot. The ingress processing engine parses the contents of the virtual channel to obtain payload data for processing packets. The ingress processing engine uses the information in the Link Channel Protocol field to parse the virtual channel. The ingress processing engine also places information in a header of each processing packet that identifies the link channel associated with the virtual channel being mapped into the packet. This information will be useful when directing the processing packet's contents through the egress flow described above.

FIG. 3C is a flowchart depicting one embodiment of a process for mapping packet data into virtual channel slots (step 36, FIG. 2B). The egress processing engine maps processing packet data into virtual channels (step 55) and maps virtual channel data into time slots (step 56) for delivery to TSI switch 108. In one implementation, these steps are performed as separate operations. In alternate implementations, these steps are combined into a single step.

In one embodiment, network switch 90 maintains mapping tables that are used by the egress processing engine to map packet data into virtual channel time slots. In one implementation, the table contains an entry for each virtual channel. Each entry includes the following fields: 1) Virtual Channel—identifying a virtual channel; 2) Time Slots—identifying all time slots in the egress processing engine's set of time slots that belong to the identified virtual channel; 3) Link Channel—identifying one or more link channels that are to have their data mapped into the identified virtual channel; and 4) Link Channel Protocol—identifying the Layer 1 and Layer 2 protocols employed for the data in the identified link channels. A user of switch 90 programs these fields in one embodiment. In further embodiments, different fields can be employed and mechanisms other than a mapping table can be employed.

The egress processing engine identifies the link channel that is intended to receive a processing packet's data. In one implementation, the processing packet's header includes this information. The egress processing engine identifies the table entry that corresponds to the link channel. The egress processing engine uses the entry to identify the corresponding virtual channel and associated time slots. The egress processing engine maps the packet data into these virtual channel time slots, based on the protocols identified in the Link Channel Protocol field.

FIG. 3D is a flowchart depicting one embodiment of a process for mapping virtual channel slot data into link channels (FIG. 44, FIG. 2B). The egress link interface maps time slot data from TSI switch 108 into virtual channels (step 57) and maps virtual channel data into frames (step 58). In one implementation, these steps are performed as separate operations. In alternate implementations, these steps are combined into a single step.

In one embodiment, network switch 90 maintains mapping tables that are used by the ingress link interface to map slot data into virtual channels and virtual channel data into frames. In one implementation, the table contains an entry for each virtual channel. Each entry includes the following fields: 1) Virtual Channel —identifying a virtual channel; 2) Time Slots—identifying all time slots in the egress link interface's set of time slots that belong to the identified virtual channel; 3) Link Channel—identifying one or more link channels that are to have their data mapped into the identified virtual channel; and 4) Link Channel Protocol—identifying the Layer 1 and Layer 2 protocols employed for the data in the identified link channels. A user of switch 90 programs these fields in one embodiment. In further embodiments, different fields can be employed and mechanisms other than a mapping table can be employed.

The egress link interface uses this table to map time slot data into virtual channels. For a time slot that arrives from TSI switch 108, the egress link interface maps data into the identified virtual channel for the time slot. For each virtual channel, the egress link interface maps the channel's data into the link interface identified for the virtual channel. For the framed data embodiment described above, the egress link interface maps the virtual channel data into one or more frames that correspond to the identified link channel. These frames can be identified as part of the Link Channel field in one embodiment. The egress link interface formats the virtual channel data in the frames, based on the identified Layer 1 and Layer 2 protocols for the link channel data.

In the frame data implementation, the egress link interface maps frame data into link channels (step 59). In one embodiment, switch 90 maintains mapping tables used by egress processing engines to map frame data into link channels. One implementation of the table contains entries for each link channel, including the following fields: 1) Link Channel—identifying a link channel for the egress processing engine; 2) Protocol—identifying Layer 1 and Layer 2 protocols for the identified link channel; and 3) Frame—identifying one or more frames that maintain data from the identified link channel. When virtual channel data is framed, the egress link interface uses the table entry that corresponds to a selected frame. The egress link interface maps the frame data into the identified channel using the identified Layer 1 and Layer 2 protocols. A user of switch 90 programs the fields in the above-identified table in one embodiment. In further embodiments, different fields can be employed and mechanisms other than a mapping table can be employed.

Figure 4:
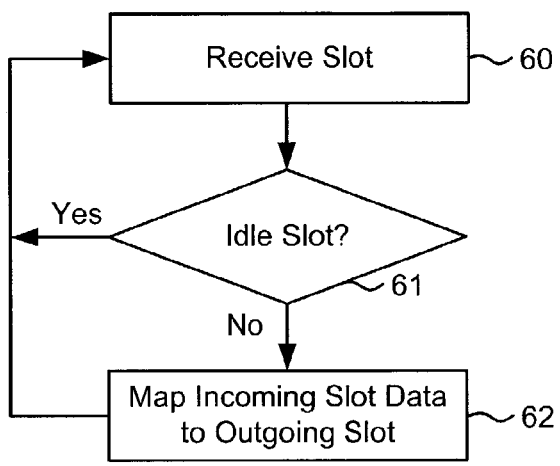
FIG. 4 is a flowchart depicting one embodiment of a process for a TSI switch to map slot data into outgoing slots.

FIG. 4 is a flowchart depicting one embodiment of a process for TSI switch 108 to map slot data into outgoing slots. Ingress link interfaces and egress processing engines forward sets of time slots to TSI switch 108. In one implementation, slots are sent to TSI switch 108 in the form of GFP framed data over SONET. In one embodiment, TSI switch 108 receives a set of 48 time slots from each ingress link interface and egress processing engine.

TSI switch 108 receives an incoming time slot (step 60). TSI switch 108 determines whether the slot has idle data (step 61). If the slot is idle, TSI switch 108 loops back to step 60 to receive the next slot. If the slot is not idle, TSI switch 108 maps the data in the slot to a slot in an outgoing set of slots (step 62). TSI switch 108 maps data from an ingress link interface to a slot in an outgoing set of slots for an ingress processing engine. TSI switch 108 maps data from an egress processing engine to a slot in an outgoing set of slots for an egress link interface. TSI switch 108 returns to step 60 to receive the next incoming slot.

In one embodiment, TSI switch 108 employs a mapping table to map incoming slot data to a slot in an outgoing set of slots (step 62). One example of a mapping table includes entries with the following fields: 1) Incoming Port—identifying an incoming TSI switch port on TSI switch 108 that is coupled to either an ingress link interface or egress processing engine to receive a set of time slots; 2) Incoming Slot—identifying a time slot in the incoming set of time of slots on the identified incoming TSI switch port; 3) Outgoing Port—identifying an outgoing TSI switch port on TSI switch 108 that is coupled to either an ingress processing engine or egress link interface to provide an outgoing set of slots; and 4) Outgoing Slot—identifying a time slot in the outgoing set of slots for the identified outgoing TSI switch port.

When time slot data is received, TSI switch 108 finds a corresponding table entry. The corresponding table entry has an Incoming Port field and Incoming Slot field that correspond to the port on which the incoming set of slots is being received and the slot in the incoming set of slots that is being received. TSI switch 108 maps the incoming slot data to a slot in an outgoing set of slots that is identified by the entry's Outgoing Port and Outgoing Slot fields. In one implementation, each outgoing set of slots corresponds to an outgoing TSI switch port in TSI switch 108. The outgoing TSI switch port is coupled to deliver the outgoing set of slots to either an egress link interface or ingress processing engine.

In alternate embodiments, different mapping table formats can be employed. For example, each incoming TSI switch port in the TSI switch has its own mapping table in one embodiment—including the Incoming Slot, Outgoing Port, and Outgoing Slot fields. Alternatively, the Outgoing Port field can be modified to identify a transmit port that corresponds to a set of slots. In different embodiments, the mapping table is replaced by a different instrumentality that serves the same purpose.

In a further implementation, the above-described mapping table includes the following additional fields: 5) Backup Outgoing Port—identifying a backup outgoing TSI switch port for the port identified in the Outgoing Port field; 6) Backup Outgoing Slot—identifying a slot in the outgoing set of slots for the port identified in the Backup Outgoing Port field; and 7) Backup—indicating whether to use the Outgoing Port and Outgoing Slot fields or the Backup Outgoing Port and Backup Outgoing Slot fields. A user of switch 90 sets values in these fields in one implementation. In an alternate embodiment, these backup fields are maintained in a central memory of switch 90 and backup values are loaded into the above-described table only when a backup is needed.

These additional table fields can be used to support redundancy. A link interface or processing engine associated with an outgoing set of slots may become disabled. When this happens, TSI switch 108 will use the Backup Outgoing Port and Backup Outgoing Slot fields in place of the Outgoing Port and Outgoing Slot fields. This provides great flexibility in creating redundancy schemes on a per channel basis, per time slot basis, per port basis, per group of ports basis, or other basis. If a link interface fails, the virtual channel slots associated with the failed link interface can be redistributed among multiple link interfaces. Similarly, if a processing engine fails, the virtual channel slots associated with the failed processing engine can be redistributed among multiple processing engines. Switch 90 implements the redistribution by modifying the mapping information in the mapping table—switch 90 sets values in the above-described Backup fields to control the mapping operation of switch 108. This flexibility allows redundancy to be shared among multiple link interfaces and processing engines. In fact, network switch 90 can avoid the traditional need of having an entire link interface PCB and an entire processing engine PCB set aside for redundancy purposes. Switch 90 can modify mapping information automatically, upon detecting a condition that calls for modification. Alternatively, a user can manually alter mapping information.

Efficiency is greatly increased when each processing engine supports all protocols used in switch 90 at the OSI model layers supported by the processing engines. In this embodiment, each processing engine can receive and process data from any time slot in any link interface's set of time slots. This allows backup processing engines to be assigned so that no processing engine becomes over utilized and no processing engine remains under utilized. In one implementation, switch 90 modifies mapping information by setting values in the Backup fields to facilitate efficient bandwidth pooling. Switch 90 monitors the utilization of processing engines and link interfaces. If any link interface or processing engine becomes over or under utilized, switch 90 sets values in the above-described Backup fields to redirect the flow of data to make link interface and processing engine utilization more evenly distributed.

In a further embodiment, switch 90 employs the above-described Backup field to implement 1:N, 1:1, or 1+1 redundancy. In 1:N redundancy, a time slot or set of time slots is reserved for backing up a set of N time slots. In 1:1 redundancy, each time slot or set of time slots is uniquely backed up by another time slot or set of time slots. In 1+1 redundancy, an incoming time slot is mapped to two outgoing time slots— one time slot identified by the Outgoing Port and Outgoing Slot fields, and another time slot identified by the Backup Outgoing Port and Backup Outgoing Slot fields. This allows redundant dual paths to be created through switch 90. The ability of switch 90 to efficiently distribute processing engine resources allows this dual path redundancy to be achieved without significant decrease in the overall throughput performance of switch 90.

Figure 5:
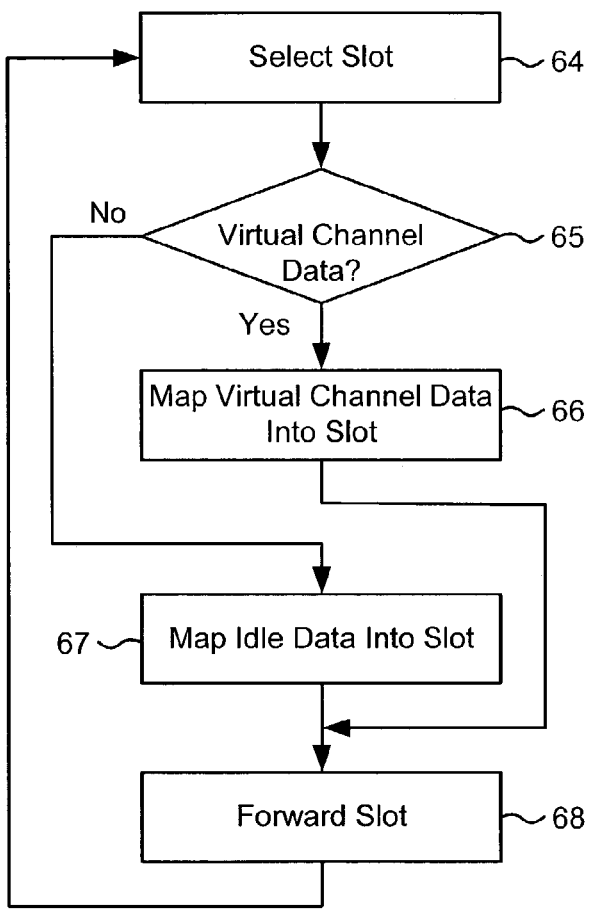
FIG. 5 is a flowchart depicting one embodiment of a process for a TSI switch to forward slots.

FIG. 5 is a flowchart depicting one embodiment of a process for TSI switch 108 to forward slots in an outgoing set of slots. TSI switch 108 selects a slot (step 64). TSI switch 108 determines whether the slot is to contain an idle signal or valid virtual channel slot data (step 65). If the slot is to be idle, TSI switch 108 maps an idle data pattern into the selected slot (step 67) and forwards the slot to an ingress processing engine or egress link interface (step 68). If the slot is not idle (step 65), TSI switch 108 maps virtual channel data into the selected slot (step 66) and forwards the slot to an ingress processing engine or egress link interface (step 68). TSI switch 108 continues to loop back to step 64 and repeat the above-described process.

In one implementation, the process in FIG. 5 can be performed in real time while the outgoing set of slots is being forwarded. Alternatively, an entire outgoing set of slots is assembled before forwarding any channels.

Figure 6:
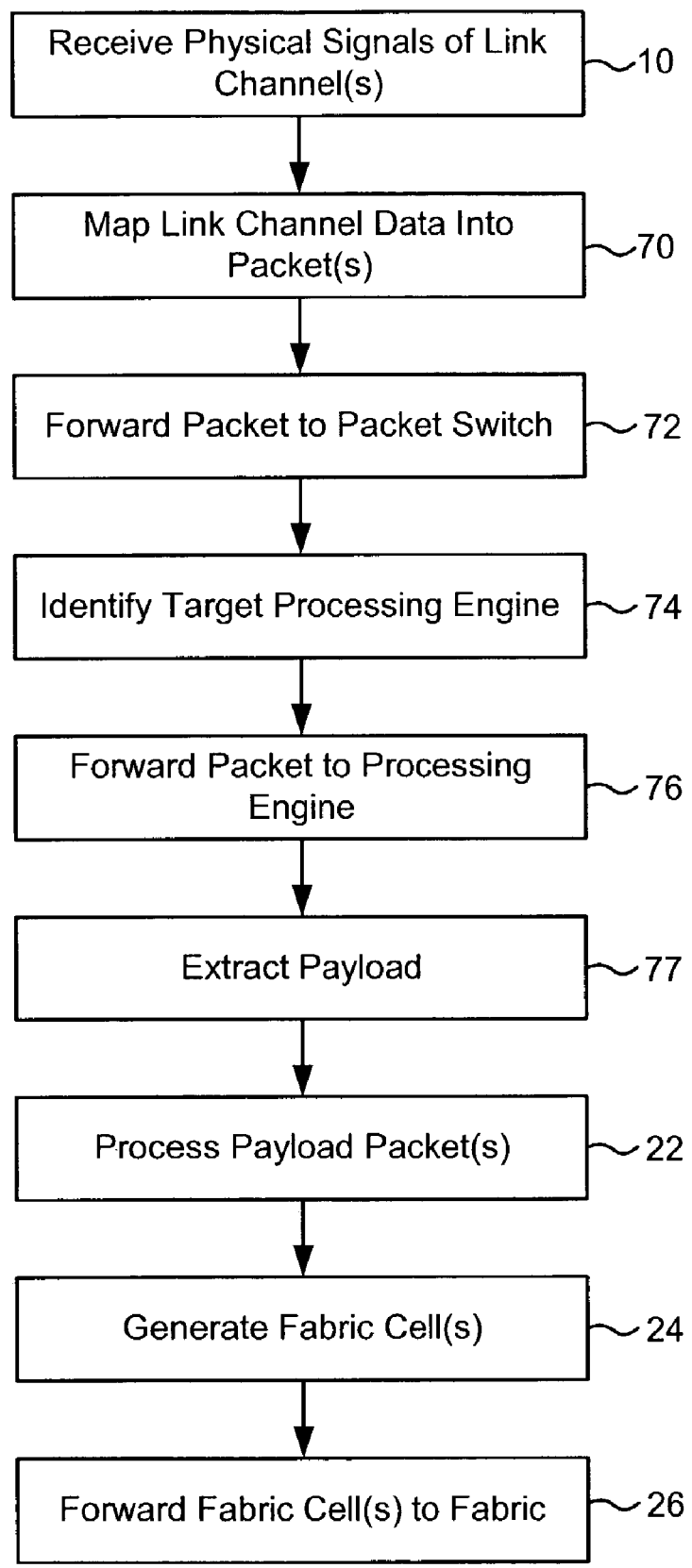
FIG. 6 is a flowchart depicting an alternate embodiment of a process for the ingress flow of data through a network switch.

FIG. 6 is a flowchart depicting an alternate embodiment of a process for the ingress flow of data through network switch 90 when switch 108 is a packet switch. The process steps with the same numbers as those appearing in FIG. 2A operate the same as described for FIG. 2A. The description in FIG. 6 will highlight the differences in the ingress data flow when packet switch 108 is employed.

After the ingress link interface receives physical signals for link channels (step 10), the ingress processing engine maps link channel data into one or more packets (step 70). The link interface forwards each packet to packet switch 108 (step 72) for delivery to an ingress processing engine. Each packet includes a payload and a header. The payload includes the data received from the physical medium that needs to be forwarded to an ingress processing engine. The header includes information necessary for packet switch 108 to properly direct the packet to a targeted ingress processing engine. The ingress link interface creates the header in the step of mapping data into the packet (step 70).

In one implementation, the header includes the following fields: 1) Destination PE—identifying the targeted ingress processing engine; 2) Source LI—identifying the ingress link interface that created the packet; 3) Source PHY—identifying the link interface transceiver that received the data in the packet's payload; and (4) Source Channel—identifying a link channel in which the payload data was received by the ingress link interface. In alternate embodiments, different header fields can be employed.

In one implementation, the ingress link interface maps data into the packet's payload (step 70) using a mapping table. One embodiment of the mapping table includes entries with the following fields: 1) Destination—identifying a processing engine; 2) Link Channel—identifying a link channel; and 3) Protocol—identifying the Layer 1 and Layer 2 protocols format of data in the identified link channel. A user of switch 90 programs these fields in one embodiment. The ingress link interface maps data into a packet from a link channel. The ingress link interface identifies a table entry that corresponds to the link channel and uses the protocols specified in the entry's Protocol field to move data from the link channel to the packet. The ingress link interface also loads the Destination PE field in the packet header with the processing engine identified in the entry's Destination field.

Packet switch 108 identifies the targeted ingress processing engine for the packet (step 74) and forwards the packet to the targeted ingress processing engine (step 76). In one implementation, packet switch 108 uses the Destination PE field in the packet header to identify the targeted ingress processing engine. The ingress processing engine extracts payload data in the packets from packet switch 108 (step 77). The ingress processing engine maps the payload data into processing packets for processing by the ingress processing engine.

In one embodiment, network switch 90 maintains mapping tables that are used by the ingress processing engine to map payload data from the ingress processing engine into processing packets (step 77). In one implementation, the table contains entries with the following fields: 1) Source Information—identifying a permutation of values from the packet header fields Source LI, Source PHY, and Source Channel; 2) Protocol—identifying the Layer 1 and Layer 2 protocols associated with the data having a header that matches the Source Information field; and 3) Link Channel—identifying the link channel that originated the data. A user of switch 90 programs these fields in one embodiment. In alternate embodiments, different fields can be employed, or other instrumentalities can replace the table.

When a packet arrives from packet switch 108, the ingress processing engine finds an entry with a Source Information field that corresponds to the values in the packet's header. The ingress processing engine then uses the identified entry's Protocol field to map the packet payload data into a processing packet. In one implementation, the ingress processing engine also includes a link channel identifier in the processing packet, based on the Link Channel field. The remaining steps in FIG. 6 conform to those described above for FIG. 2.

Figure 7:
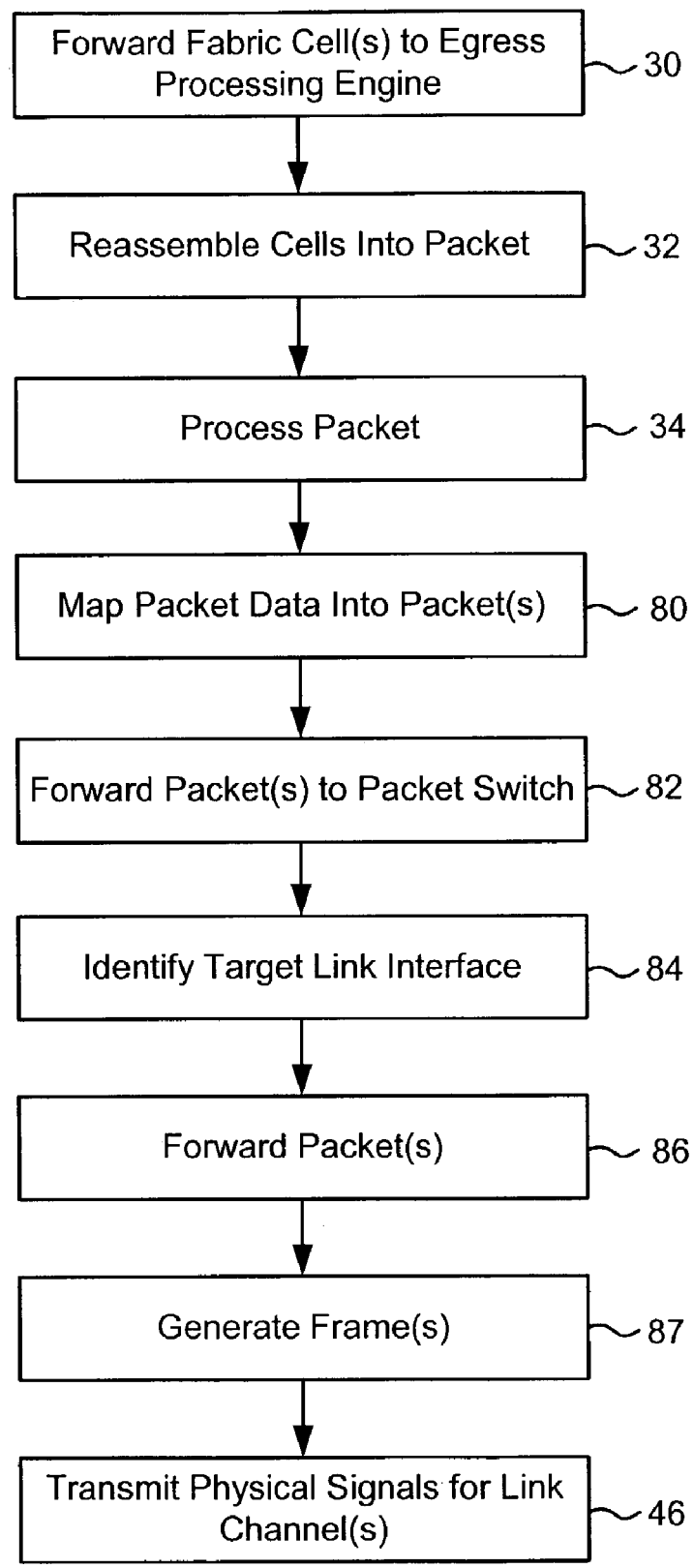
FIG. 7 is a flowchart depicting an alternate embodiment of a process for the egress flow of data through a network switch.

FIG. 7 is a flowchart depicting an alternate embodiment of a process for the egress flow of data through network switch 90 when switch 108 is a packet switch. The steps in FIG. 7 with the same reference numbers as those in FIG. 3 operate in the same manner described for FIG. 3. The description of FIG. 7 will highlight the differences in the egress data flow when switch 108 is a packet switch.

After processing packets from reassembled fabric cells (Step 34), the egress processing engine maps packet data into new packets for delivery to packet switch 108 (step 80). In one implementation, the egress processing engine uses a mapping table to perform this operation. One embodiment of the mapping table includes the following fields: 1) Packet Information—identifying information to use in a packet header; 2) Link Channel—identifying a link channel that originated the data being put into the packet; and 3) Protocol—identifying the Layer 1 and Layer 2 protocols for the packet data. A user of network switch 90 configures these fields. In alternate embodiments, different fields can be employed, or the table can be replaced by a different instrumentality.

The egress processing engine identifies a table entry that has a Link Channel field that corresponds to the link channel that originated the payload data in the processing packet. The egress processing engine maps the payload data into a packet for packet switch 108, based on the protocols in the corresponding Protocol field. The egress processing engine uses the entry's Packet Information field to create a header for the packet. In one implementation, the packet headers include the following fields: 1) Source PE—identifying the egress processing engine that created the packet; 2) Destination LI—identifying a targeted egress link interface for the packet 3) Destination PHY—identifying a targeted transceiver on the identified egress link interface; and (4) Destination Channel—identifying a targeted link channel in which the payload data is to be transmitted from the egress link interface. In alternate embodiments, different header fields can be employed.

The egress processing engine forwards the new packets to packet switch 108 for switching to the targeted egress link interface (step 82). Packet switch 108 identifies the targeted egress link interface for the incoming packet (step 84). Packet switch 108 uses the header information in the packet to make this identification. For the header described above, the Destination LI field identifies the targeted egress link interface. Packet switch 108 forwards the packet to the targeted egress link interface (step 86). Transmission data frames are generated (step 87) and physically transmitted (step 46). In order to generate frames (step 87), the egress processing engine uses the header fields in the packet from packet switch 108. In one implementation, packet switch 108 uses the Destination PHY and Destination Channel fields to generate these frames.

Figure 8:
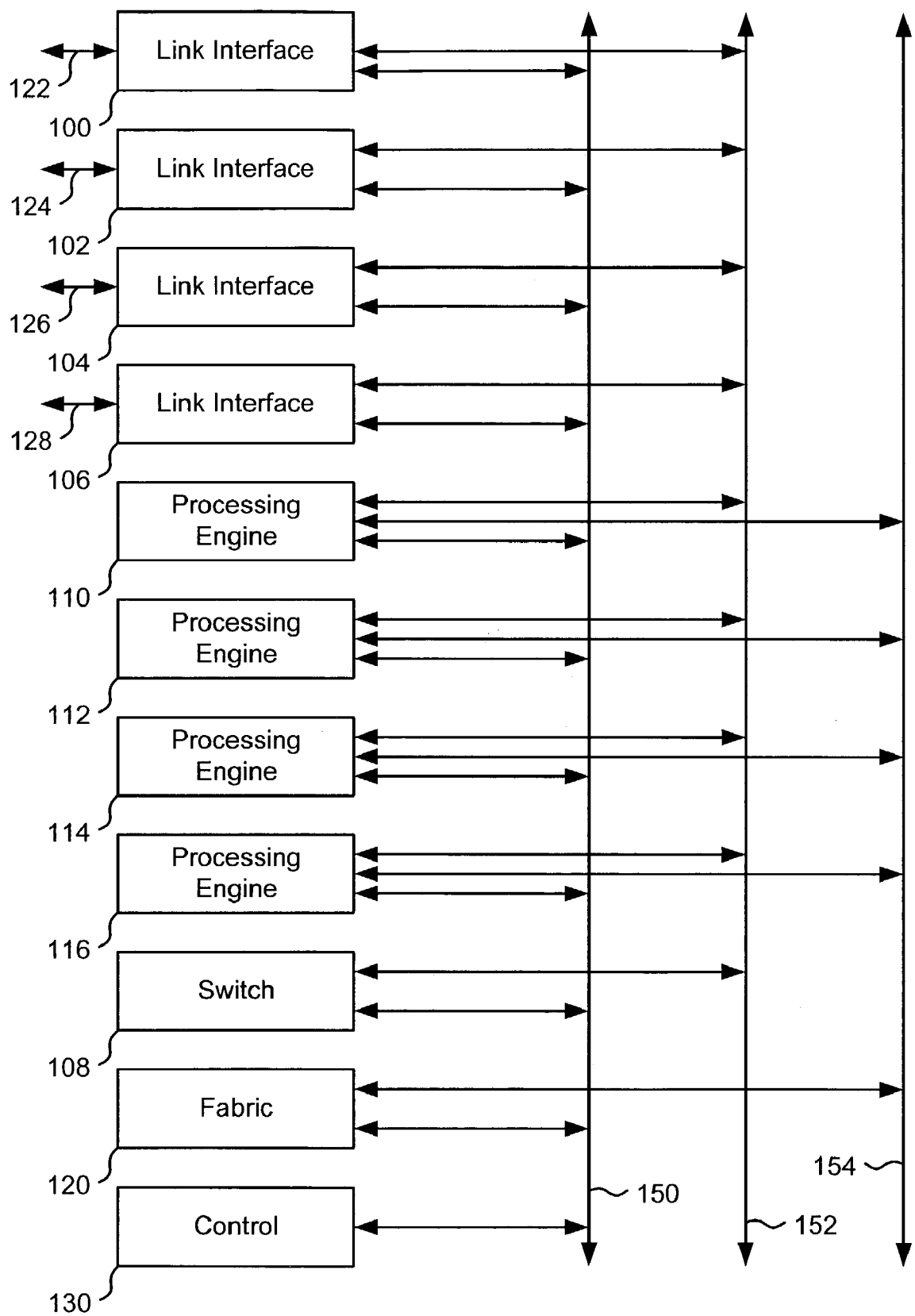
FIG. 8 is a block diagram depicting one embodiment of a mid-plane multiple card architecture for a network switch.

FIG. 8 is a block diagram depicting one embodiment of switch 90, implemented with a mid-plane architecture. Switch 90 includes control module 130, which is coupled to control bus 150. The above-described link interfaces 100, 102, 104, and 106, processing engines, 110, 112, 114, and 116, switch 108, and fabric 120 are also coupled to control bus 150. Control bus 150 carries control information for directing the operation of components in switch 90. In one implementation, control bus 150 is a 100 Base-T Ethernet communication link. In such an embodiment, control bus 150 employs the 100 Base-T Ethernet protocols for carrying and formatting data. In alternate embodiments, a variety of different protocols can be employed for implementing control bus 150. In a further embodiment, control bus 150 is a star-like switched Ethernet network. Further details regarding the operation of control module 130 are provided below.

Link interfaces 100, 102, 104, and 106, processing engines 110, 112, 114, and 116, and switch 108 are coupled to switch plane 152. Switch plane 152 carries sets of time slots. In one implementation, switch 108 is a TSI switch and switch plane 152 carries GFP framed data over SONET. In one such implementation, the capacity of switch plane 152 is 2.488 Giga-bits per second, with the SONET frame containing 48 time slots that each support bandwidth equivalent to one STS-1 channel. Alternatively, the frame may include higher bandwidth channels or even different size channels. In further embodiments, switch plane 152 carries STS-192 SONET. In another embodiment, switch 108 is a packet switch and switch plane 152 carries packets. Processing engines 110, 112, 114, and 116 and fabric 120 are coupled to fabric plane 154. The processing engines and fabric 120 exchange fabric cells across fabric plane 154.

FIG. 8 shows data planes 152 and 154 as separate from control bus 150. In alternate embodiments, control bus 150 can be implemented as part of switch plane 152 and fabric plane 154.

Figure 9:
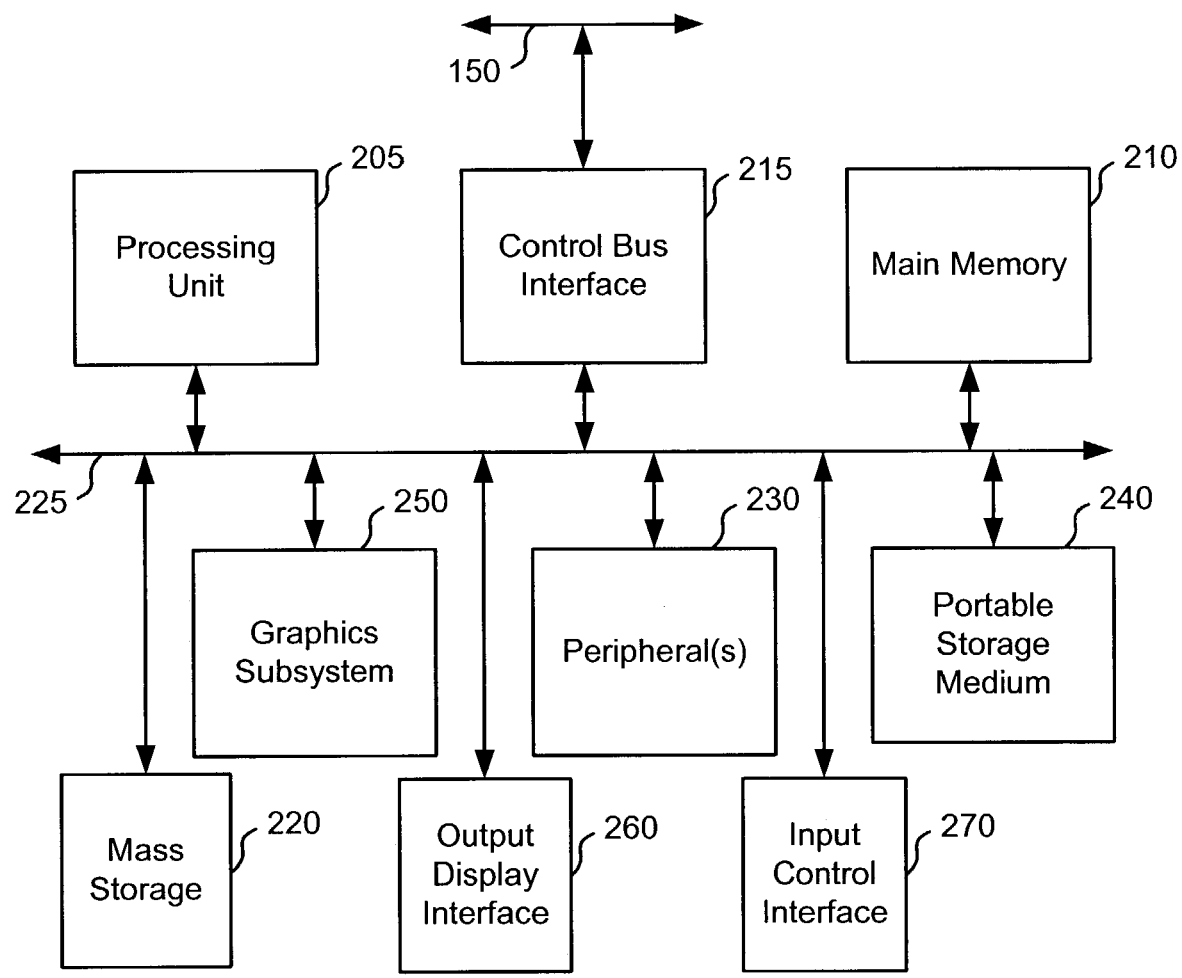
FIG. 9 is a block diagram depicting one embodiment of a control module.

FIG. 9 is a high-level block diagram depicting one embodiment of control module 130. In one embodiment, control module 130 is a PCB in switch 90. Control module 130 directs the operation of link interfaces 100, 102, 104, and 106, processing engines 110, 112, 114, and 116, switch 108, and fabric 120. In one implementation, control module 130 directs the operation of these components by issuing configuration and operation instructions that dictate how the components operate.

Control module 130 also maintains a management information base ("MIB") that maintains the status of each component at various levels of detail. In one implementation, the MIB maintains information for each link interface and each processing engine. This enables control module 130 to determine when a particular component in switch 90 is failing, being over utilized, or being under utilized. Control module 130 can react to these determinations by making adjustments in the internal switching of data between link interfaces and processing engines through switch 108—changing switching of data associated with failed or inefficiently utilized components.

In one example, control module 130 detects that a processing engine is under utilized. Control module 130 responds by arranging for switch 108 to switch one or more time slots from one or more link interfaces to the under utilized processing engine. In another example, control module 130 determines that a failure occurred at a link interface. Control module 130 arranges for switch 108 to switch each time slot originally directed to the failed link interface to one or more different link interface. In one implementation, the time slots are distributed to several alternative link interfaces. Control module 130 facilitates the above-described time slot switching changes by modifying mapping table information, such as the Backup field, in one embodiment. The mapping table information can be maintained in control module 130 or distributed on switch 108.

In one embodiment, control module 130 contains processing unit 205, main memory 210, and interconnect bus 225. Processing unit 205 may contain a single microprocessor or a plurality of microprocessors for configuring control module 130 as a multi-processor system. Processing unit 205 is employed in conjunction with a memory or other data storage medium containing application specific program code instructions to implement processes carried out by switch 90.

Main memory 210 stores, in part, instructions and data for execution by processing unit 205. If a process is wholly or partially implemented in software, main memory 210 can store the executable instructions for implementing the process. In one implementation, main memory 210 includes banks of dynamic random access memory (DRAM), as well as high-speed cache memory.

Control module 130 further includes control bus interface 215, mass storage device 220, peripheral device(s) 230, portable storage medium drive(s) 240, input control device interface 270, graphics subsystem 250, and output display interface 260, or a subset thereof in various embodiments. For purposes of simplicity, all components in control module 130 are shown in FIG. 9 as being connected via bus 225. Control module 130, however, may be connected through one or more data transport means in alternate implementations. For example, processing unit 205 and main memory 210 may be connected via a local microprocessor bus. Control bus interface 215, mass storage device 220, peripheral device(s) 230, portable storage medium drive(s) 240, and graphics subsystem 250 may be coupled to processing unit 205 and main memory 210 via one or more input/output busses.

Mass storage device 220 is a non-volatile storage device for storing data and instructions for use by processing unit 205. Mass storage device 220 can be implemented in a variety of ways, including a magnetic disk drive or an optical disk drive. In software embodiments of the present invention, mass storage device 220 stores the instructions executed by control module 130 to perform processes in switch 90.

Portable storage medium drive 240 operates in conjunction with a portable non-volatile storage medium to input and output data and code to and from control module 130.

Examples of such storage mediums include floppy disks, compact disc read only memories (CD-ROM) and integrated circuit non-volatile memory adapters (i.e. PC-MCIA adapter). In one embodiment, the instructions for control module 130 to execute processes in switch 90 are stored on such a portable medium, and are input to control module 130 via portable storage medium drive 240.

Peripheral device(s) 230 may include any type of computer support device, such as an input/output interface, to add additional functionality to control module 130. For example, peripheral device(s) 230 may include a communications controller, such as a network interface, for interfacing control module 130 to a communications network. Instructions for enabling control module 130 to perform processes in switch 90 may be downloaded into main memory 210 over a communications network. Control module 130 may also interface to a database management system over a communications network or other medium that is supported by peripheral device(s) 230.

Input control device interface 270 provides interfaces for a portion of the user interface for control module 130. Input control device interface 270 may include an alphanumeric keypad for inputting alphanumeric and other key information, a cursor control device, such as a mouse, a trackball, stylus, or cursor direction keys. In order to display textual and graphical information, control module 130 contains graphics subsystem 250 and output display interface 260. Output display interface 260 can include an interface to a cathode ray tube display or liquid crystal display. Graphics subsystem 250 receives textual and graphical information, and processes the information for output to output display interface 260.

Control bus interface 215 is coupled to bus 225 and control bus 150. Control bus interface 215 provides signal conversion and framing to support the exchange of data between bus 225 and control bus 150. In one implementation, control bus interface 215 implements 100 Base-T Ethernet protocols—converting data between the format requirements of bus 225 and the 100 Base-T Ethernet format on control bus 150.

Figure 10:
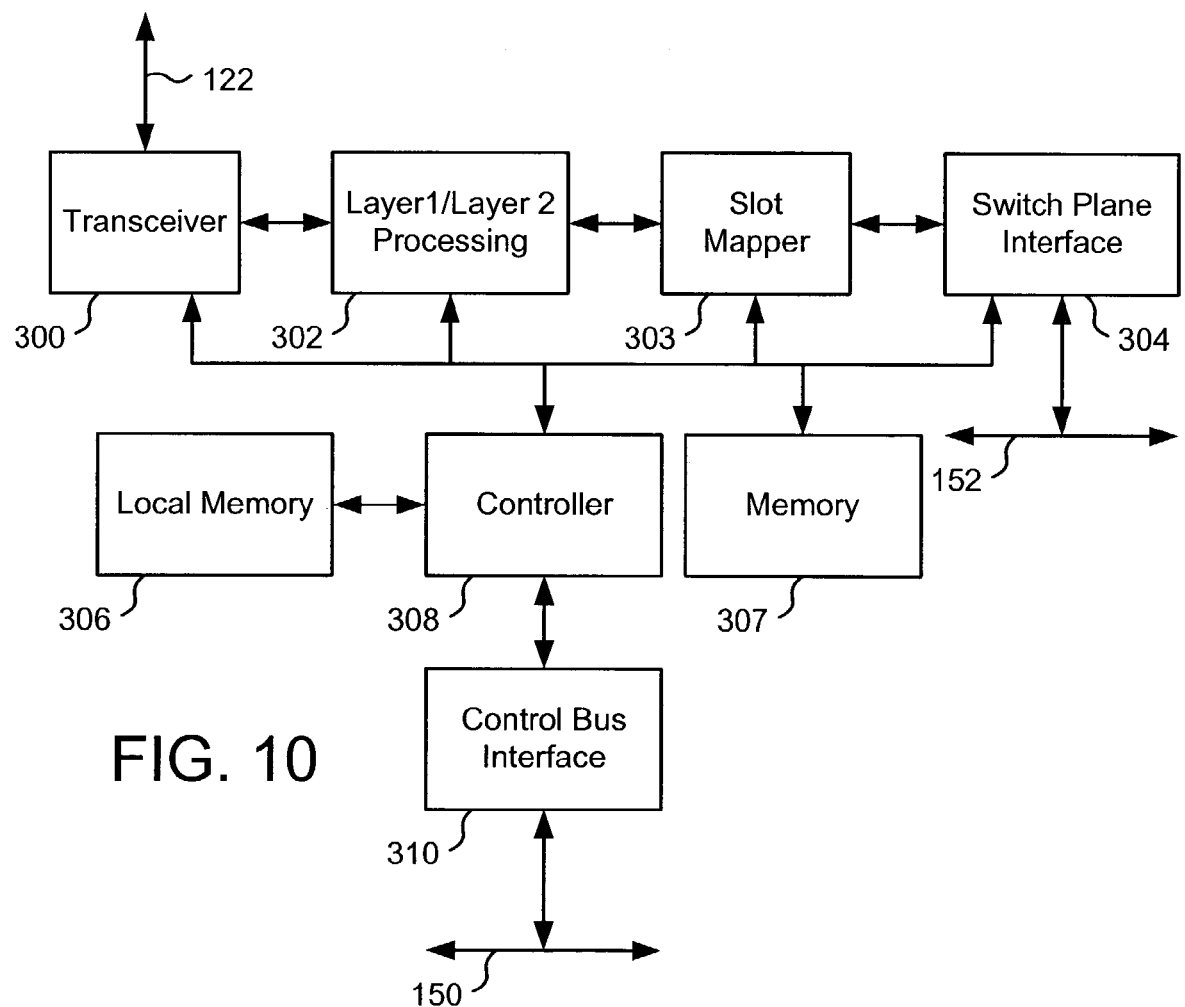
FIG. 10 is a block diagram depicting one embodiment of a link interface.

FIG. 10 is a block diagram of one embodiment of a link interface in switch 90, such as link interface 100, 102, 104, or 106. The link interface in FIG. 10 is for use when switch 108 is a TSI switch. In one implementation, the link interface shown in FIG. 10 is a PCB. FIG. 10 will be described with reference to link interface 100, but the implementation shown in FIG. 10 can be applicable to other link interface modules. In one implementation, each link interface resides in switch 90 as a PCB.

Link interface 100 includes transceiver 300 for receiving and transmitting data signals on medium 122 in accordance with the physical signaling requirements of medium 122. In one implementation, transceiver 300 is an optical transceiver. In another embodiment, transceiver 300 is a Giga-bit Ethernet transceiver for exchanging physical signals with medium 122 in accordance with the physical signaling standards of Giga-bit Ethernet.

Transceiver 300 is coupled to Layer 1/Layer 2 processing module 302. During ingress, transceiver 300 sends signals from medium 122 to processing module 302. In one implementation, processing module 302 carries out all Layer 1 processing for incoming data and a portion of required Layer 2 processing. In some implementations, processing module 302 does not perform any Layer 2 processing. Processing module 302 supports different protocols in various embodiments. During an egress operation, processing module 302 processes data according to Layer 1 and Layer 2 protocols to prepare the data for transmission onto medium 122.

Processing module 302 is coupled to slot mapper 303. During ingress, slot mapper 303 obtains data from processing module 302. Slot mapper 303 performs the above-described operations for mapping data into virtual channel time slots (steps 51 and 52, FIG. 3A) and forwarding time slot to TSI switch 108 (step 14, FIG. 2A). During egress, slot mapper 303 receives data from processing engines over switch plane 152. Slot mapper 303 maps slot data into virtual channels for use by processing module 302 in performing Layer 2 framing and Layer 1 processing.

Slot mapper 303 is coupled to switch plane interface 304. Switch plane interface 304 is coupled to switch plane 152 to transfer data between channel mapper 303 and plane 152. During data ingress, switch plane interface 304 forwards sets of time slots from slot mapper 303 onto switch plane 152. In one implementation, interface 304 sends sets of time slots over switch plane 152 in the form of GFP framed data over SONET. During egress, interface 304 transfers data from switch plane 152 to slot mapper 303.

Controller 308 directs the operation of transceiver 300, processing module 302, slot mapper 303, and switch plane 304. Controller 308 is coupled to these components to exchange information and control signals. Controller 308 is also coupled to local memory 306 for accessing data and software instructions that direct the operation of controller 308. Controller 308 is coupled to control bus interface 310, which facilitates the transfer of information between link interface 100 and control bus 150. Controller 308 can be implemented using any standard or proprietary microprocessor or other control engine. Controller 308 responds to instructions from control module 130 that are received via control bus 150. Memory 307 is coupled to controller 308, Layer 1/Layer 2 processing module 302, and slot mapper 303 for maintaining instructions and data.

Controller 308 performs several functions in one embodiment. Controller 308 collects network related statistics generated by transceiver 300 and Layer 1/Layer 2 processing module 302. Example statistics include carrier losses on medium 122 and overflows in Layer1/Layer 2 processing module 302. Controller 308 and control module 130 employ these statistics to determine whether any failures have occurred on link interface 100. The collected statistics can also enable controller 308 and control module 130 to determine the level of bandwidth traffic currently passing through link interface 100. Control module 130 uses this information to ultimately decide how to distribute the bandwidth capacity of link interfaces and processing engines within switch 90. Controller 308 carries out instructions from control module 130 when implementing link interface and processing engine switchovers to account for failures or improved resource utilization. The instructions may call for activating or deactivating transceiver 300.

In one example, controller 308 identifies a failure in transceiver 300. Controller 308 stores this indication in a database in memory 307. The failure information stored in memory is provided to control module 130. Control module 130 uses this information to deactivate link interface 100 and initiate a switchover process—assigning one or more link interfaces in switch 90 to begin carrying out the operations of link interface 100.

In another example, controller 308 provides control module 130 with information relating to the amount of bandwidth being utilized on link 122—indicating whether link interface 100 can handle more traffic or needs assistance in handling the current traffic. Based on this information, control module 130 may decide to switchover some of the responsibilities of link interface 100 to one or more different link interfaces. If a switchover is needed, control module 120 arranges for the mapping table information to be modified, as described above for one embodiment.

Figure 11:
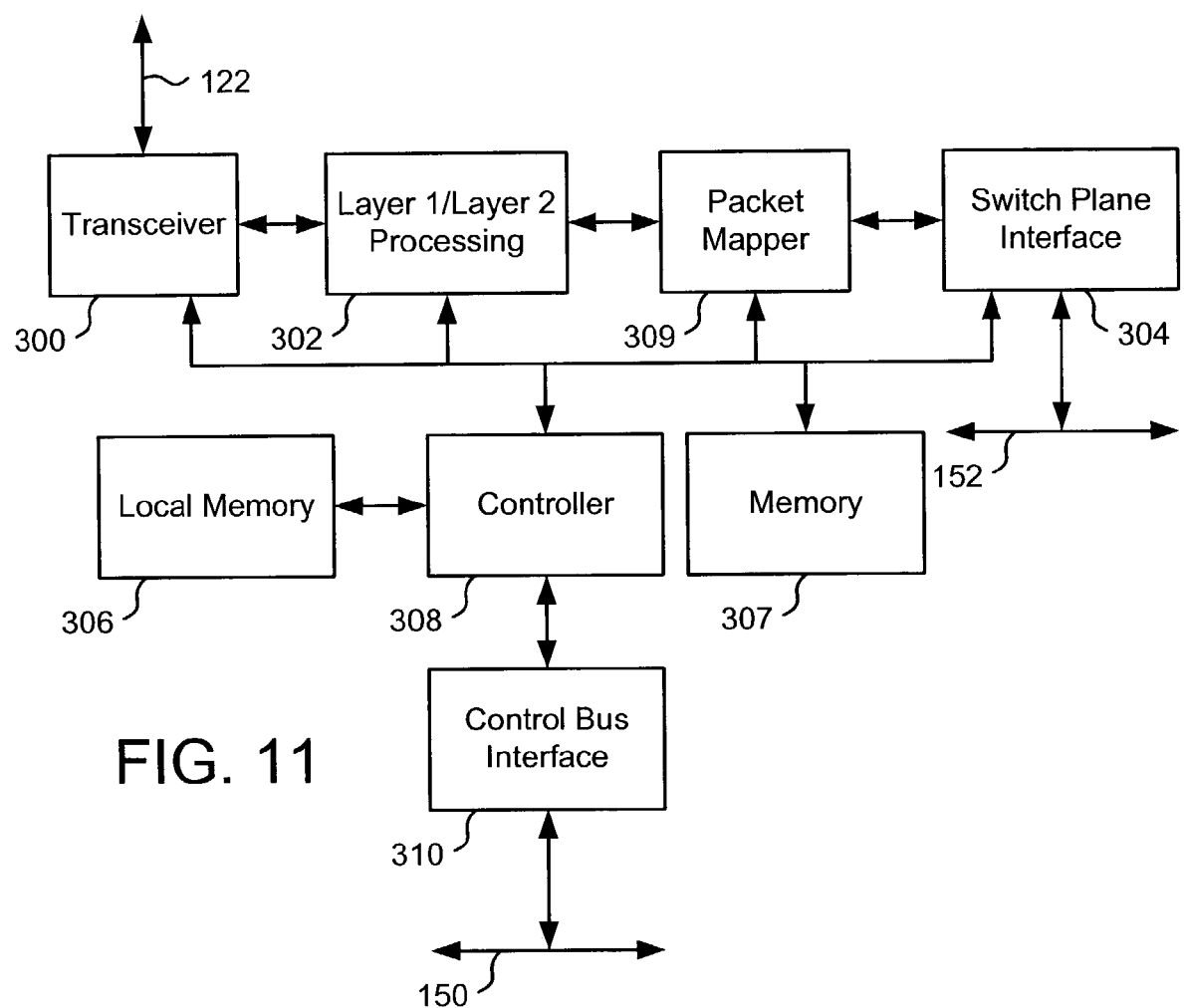
FIG. 11 is a block diagram depicting an alternate embodiment of a link interface.

FIG. 11 is a block diagram depicting an alternate embodiment of a link interface when switch 108 is a packet switch. The components of FIG. 11 that are numbered the same as a component in FIG. 10 operate the same as described for FIG. 10. The only difference is that slot mapper 303 from FIG. 10 is replaced by packet mapper 309. Packet mapper 309 is coupled to exchange data with Layer 1\Layer 2 processing module 302 and switch plane interface 304.

During ingress, packet mapper 309 maps data into packets (step 70, FIG. 6). Packet mapper 309 retrieves data from processing module 302. Packet mapper 309 maps the data into packet payloads and places headers on the packets. Packet mapper 309 then forwards the packets to switch plane 304, which forwards the packets to packet switch 108.

During egress, packet mapper 309 assists in generating data frames for transmission (step 87, FIG. 7). Packet mapper 309 receives data from switch plane interface 304 in the form of packets formatted for packet switch 108. Packet mapper 309 places the data for the packets into a format that allows processing module 302 to properly direct the packet payloads into frames for transmission by transceiver 300.

Figure 12:
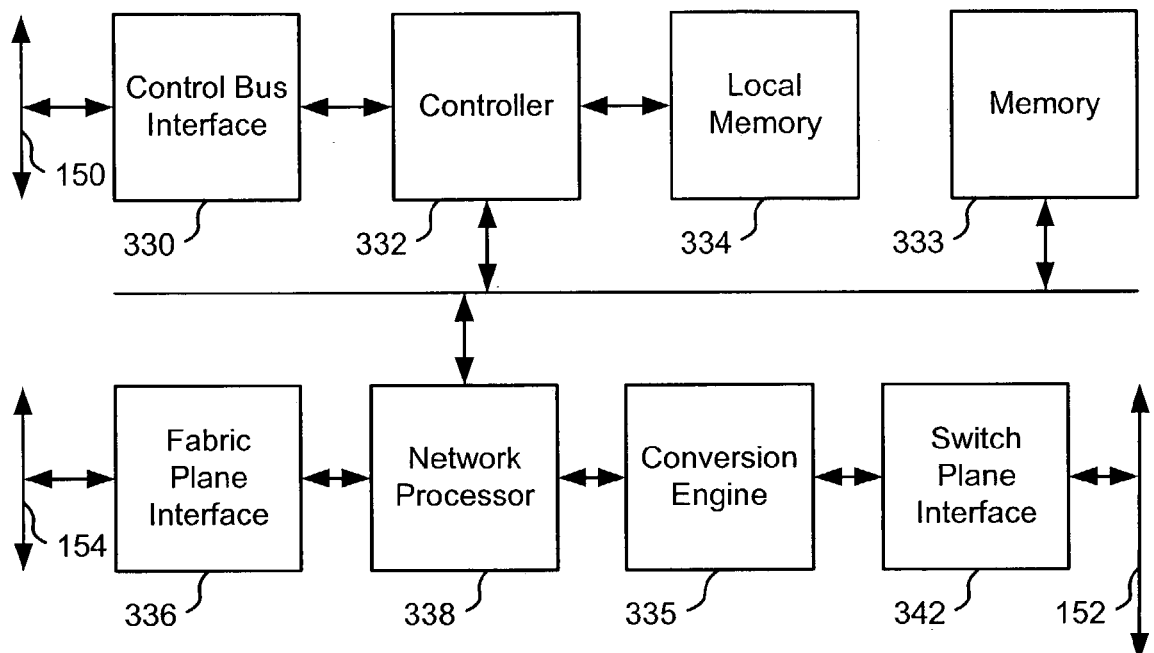
FIG. 12 is a block diagram depicting one embodiment of a processing engine.

FIG. 12 is a block diagram depicting one embodiment of a processing engine in switch 90, such as processing engines 110, 112, 114, and 116. In one embodiment, processing engines 110, 112, 114, and 116 are each implemented as PCBs in switch 90. In one implementation, each processing engine in switch 90 support all of the protocols for each OSI model layer supported on the processing engine. This enables any processing engine to exchange data with any link interface in switch 90. This provides switch 90 with the freedom to allocate processing engine resources without considering the protocol employed in incoming data. The granularity of internal data switching between link interfaces and processing engines can vary in different embodiments. In one embodiment, switch 90 is able to individually switch a single time slot of data from each link interface to a processing engine.

Although FIG. 12 is described with respect to processing engine 110, the description applies to all processing engines in switch 90. Processing engine 110 includes network processor 338 coupled to exchange information with fabric plane interface 336 and switch plane interface 342 via conversion engine 335. Interface 342 is coupled to switch plane 152 to exchange data between processing engine 110 and switch 108. Interface 336 is coupled to fabric plane 154. Interface 336 uses plane 154 to exchange data between processing engine 110 and fabric 120.

During data ingress, interface 342 receives data provided on plane 152. Interface 342 provides the data to conversion engine 335. Conversion engine 335 extracts payloads (step 20, FIG. 2A) from received sets of time slots for processing (step 22, FIG. 2A) at Layer 2 and above. Conversion engine 335 maps an extracted payload into a desired packet format and forwards the packet to network processor 338 for processing.

Network processor 338 processes data from plane 152 according Layer 2 protocols and above. Network processor 338 also performs the above-described function of generating fabric cells (step 24, FIG. 2A). Fabric plane interface 336 receives fabric cells from network processor 338. Interface 336 transmits the fabric payload onto fabric plane 154 (step 26, FIG. 2A).

During data egress, network processor 338 processes data in fabric cells received from fabric plane 154 through fabric plane interface 336—reassembling cells into packets and processing the packets at Layer 2 and above (steps 32 and 34, FIG. 2B). Network processor 338 passes processed data to conversion engine 335. Conversion engine 335 maps the data into one or more virtual channel time slots (step 36, FIG. 2B). Conversion engine 335 passes egress sets of time slots to plane 152 via switch plane interface 342. Interface 342 places sets of time slots on plane 152, which carries the data to switch 108.

In an alternate embodiment, switch 108 is a packet switch. In this embodiment, conversion engine 335 converts data between processing packets and packets exchanged with packet switch 108 (step 77, FIG. 6 and step 80, FIG. 7).

Network processor 338 carries out operations that support the applications running on switch 90. For example, switch 90 may support virtual private networks by acting as a Provider Edge Router. Network processor 338 maintains routing tables for the virtual private networks. Processing engine 338 employs the tables to properly route data for a VPN to the next step in a virtual circuit in the VPN.

Processing engine 110 also includes controller 332, which is coupled to local memory 334 and control bus interface 330. Network processor 338 is coupled to controller 332 to receive data and control instructions. Controller 332 performs many of the same functions described above for controller 308 on link interface 100, except that controller 332 performs operations specific to the operation of processing engine 110. Local memory 334 holds instructions for controller 332 to execute, as well as data maintained by controller 332 when operating. Control bus interface 330 operates the same as the above-described control bus interface 310 in FIG. 10. Memory 333 is coupled to controller 332 and network processor 338 to maintain data and instructions.

One application performed on controller 332 is the maintenance of network related statistics. Network processor 338 collects statistics based on information in the data frames passing through processing engine 110. These statistics identify whether a failure has occurred on processing engine 110 or another component within switch 90. Additional statistics collected by network processor 338 indicate the level of utilization that processing engine 110 is experiencing. These statistics are made available to controller 332 for delivery to control module 130.

Example statistics include whether frames have been dropped and the number of frames passing through network processor 338. When a failure is detected, controller 332 signals control module 130 over bus 150. In one implementation, controller 332 performs this operation by sending data over bus 150 that contains information to indicate that a failure has taken place. Similarly controller 332 can send information over bus 150 to control module 130 that indicates the level of bandwidth utilization on processing engine 110. Alternatively, control module 130 can access raw statistics in local memory 334 and memory 333 and make failure and utilization assessments.

In response to the statistics provided by controller 332, control module 130 may decide that it is appropriate to perform a switchover that involves processing engine 110 or other components within switch 90. Control module 130 sends instructions to controller 332 over bus 150 to identify the actions for processing engine 110 to implement to facilitate a switchover. These actions may include activating or deactivating processing engine 110. In the case of processing engine 110 being substituted for another processing engine, control module 130 may provide controller 332 with information that brings processing engine 110 to the current state of the other processing engine. This allows processing engine 110 to operate in place of the replaced component.

Controller 332 can also support the performance of many other applications by network processor 338. In various embodiments, controller 332 can direct the operation of network processor 338 in performing tunneling, frame relay support, and Ethernet switching and bridging functions. These are only examples of some applications that can be performed on processing engine 110. A wide variety of applications can operate on processing engine 110.

Figure 13:
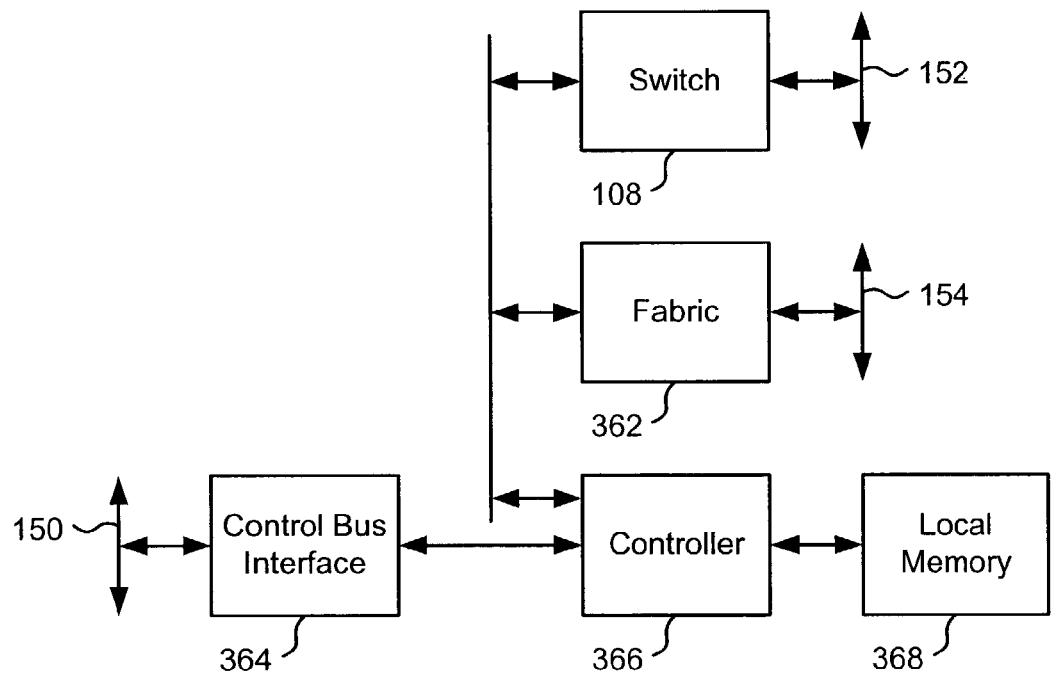
FIG. 13 is a block diagram depicting one embodiment of a combined fabric and switch card.

FIG. 13 is a block diagram depicting one embodiment of a single line card module that contains both fabric 120 and switch 108. Switch 108 directs data between link interfaces and processing engines over switch plane 152. During ingress, data passes from an ingress link interface onto plane 152, into switch 108, back onto plane 152, and into one or more processing engines. During egress, switch 108 receives data from an egress processing engine on plane 152 and provides that data to one or more egress link interfaces via plane 152. Fabric 120 provides for the exchange of data between processing engines. Fabric 120 receives data on plane 154 from an ingress processing engine and passes the data to an egress processing engine on plane 154.

Switch 108 and fabric 120 are both coupled to controller 366. Controller 366 interfaces with local memory 368 and network control bus interface 364 in a manner similar to the one described above for controller 308 in link interface 100 (FIG. 10). Memory 368 maintains instructions for directing the operation of controller 366, as well as data employed by controller 366 in operation. Control bus interface 364 allows controller 366 to exchange data and control information with control module 130 over control bus 150. In one implementation, control bus interface 364 supports the transmission of 100 Base-T Ethernet information over control bus 150.

As with the controllers described above, controller 366 supports the performance of a number of applications by fabric 120 and switch 108. In one application, controller 366 collects statistical information from switch 108 and fabric 120. One type of statistical information identifies the amount of data passing through fabric 120 and switch 108. Other statistics indicate whether switch 108 or fabric 120 have failed. Those skilled in the art will recognize that various embodiments of the invention allow for controller 366 to collect a wide array of different statistical information. Controller 366 communicates the collected statistical information to control module 130 over bus 150. Control module 130 uses the statistical information to determine whether the responsibilities assigned to any link interface or processing engine need to be redistributed.

Controller 366 also supports the redistribution of responsibilities—enabling control module 130 to change switching rules in switch 108. For example, controller 366 can program the above-described Backup field values in TSI switch 108—redistributing time slot data among different link interfaces and processing engines.

Figure 14:
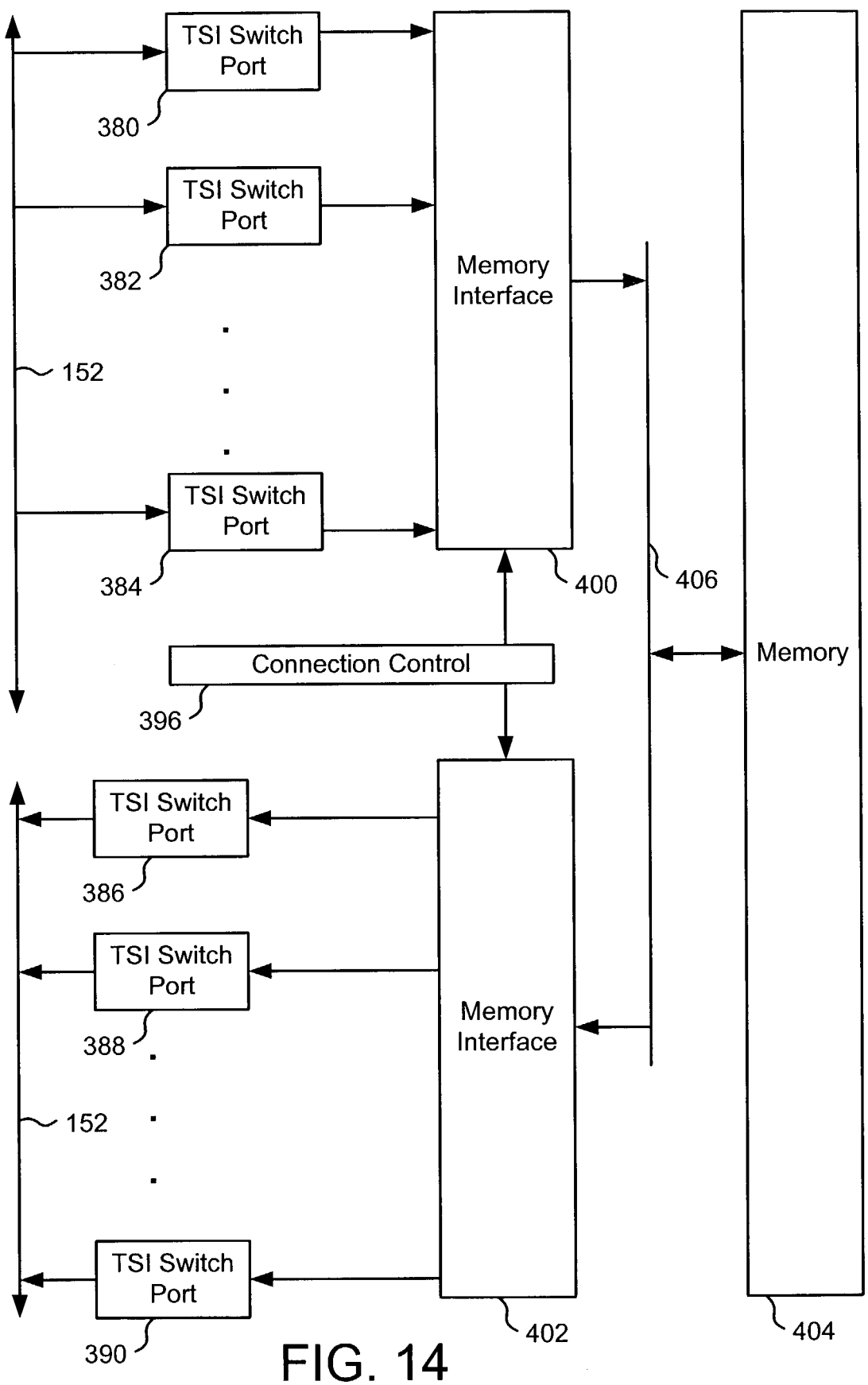
FIG. 14 is a block diagram depicting one embodiment of a TSI switch.

FIG. 14 is a block diagram depicting one embodiment of TSI switch 108. TSI switch 108 includes an incoming TSI switch port for each link interface and an incoming TSI switch port for each processing engine. Each incoming TSI switch port is coupled to either a link interface or processing engine. In one embodiment, TSI switch 108 includes 24 incoming TSI switch ports coupled to link interfaces and 12 incoming TSI switch ports coupled to processing engines. A subset of the incoming TSI switch ports in TSI switch 108 are shown in FIG. 14 as TSI switch ports 380, 382 and 384. Incoming TSI switch ports coupled to link interfaces receive ingress data in the form of a set of time slots, such as 48 time slots sent in the format of GFP framed data over a SONET. Incoming TSI switch ports coupled to processing engines receive egress data in the form of a set of time slots, such as 48 time slots sent in the format of GFP framed data over SONET.

The incoming TSI switch ports are used during the process steps described above with reference to FIG. 4 for receiving and mapping incoming time slot data to outgoing time slots. Each incoming TSI switch port is coupled to switch plane 152 to receive a set of time slots from either a link interface or processing engine. Each incoming TSI switch port is also coupled to memory interface 400. When an incoming TSI switch port receives a time slot of data (step 60, FIG. 4), TSI switch 108 maps the slot data to a time slot in an outgoing set of time slots (step 62, FIG. 4). TSI switch 108 maps the slot data by storing it into a location in memory 404 that is designated for the slot in the outgoing set of time slots. Each incoming TSI switch port is coupled to memory interface 400, which is coupled to memory bus 406. Memory bus 406 is coupled to memory 404 to exchange data. In operation, data from a slot in an incoming TSI switch port is provided to memory interface 400 along with an identifier for a slot in an outgoing set of time slots. Memory interface 400 loads the data from the incoming TSI switch port's slot into a location in memory 404 that corresponds to the identified time slot in the outgoing set of time slots.

TSI switch 108 also includes connection control 396. Connection control 396 is coupled to memory interface 400 to provide mapping information. The information from connection control 396 informs memory interface 400 where to map each incoming time slot. In one implementation, connection control 396 includes the above-described mapping tables employed by TSI switch 108.

TSI switch 108 also includes a set of outgoing TSI switch ports. Each outgoing TSI switch port is coupled to either a link interface or a processing engine to forward outgoing sets of time slots. TSI switch 108 includes an outgoing TSI switch port for each link interface and an outgoing TSI switch port for each processing engine. The outgoing TSI switch ports are coupled to the link interfaces and processing engines over switch plane 152. Outgoing TSI switch ports coupled to processing engines deliver outgoing sets of time slots to the processing engine during ingress data flow. Outgoing TSI switch ports coupled to link interfaces provide outgoing sets of time slots to the link interfaces during egress data flow. FIG. 14 shows a subset of the outgoing TSI switch ports as transmit ports 386, 388 and 390.

The outgoing TSI switch ports are used in carrying out the forwarding of outgoing sets of time slots as shown above in FIG. 5. When an outgoing set of time slots needs to be transmitted, memory interface 402 retrieves the data for the time slots from locations in memory 404 that are designated to the slots (step 66, FIG. 5). Connection control 396 is coupled to memory interface 402 to indicate whether valid data exists in memory 404 for a time slot or idle data needs to be resident in the portion of the outgoing TSI switch port corresponding to the slot. When valid data exists, memory interface 402 retrieves the data from memory 404.

Each outgoing TSI switch port communicates with memory 404 through memory interface 402 over memory bus 406. Each outgoing TSI switch port is coupled to memory interface 402. Memory interface 402 is coupled to memory bus 406 to retrieve data from memory 404 to service channel data requests from transmit ports.

In alternate embodiments, different designs can be employed for TSI switch 108 that facilitate the above-described operation of TSI switch 108. In various embodiments, different TDM switches can be employed.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A network switch comprising:
   a plurality of link interfaces;
   a plurality of processing engines;
   a switch fabric coupled to said plurality of processing engines; and
   a switch coupling said plurality of link interfaces to said plurality of processing engines, wherein said switch is configured to:
   map data from at least one time slot in a set of time slots from a link interface in said plurality of link interfaces to at least one outgoing set of time slots; and
   forward each outgoing set of time slots in said at least one outgoing set of time slots to a processing engine in said plurality of processing engines,
   wherein said switch is configured to map data in response to mapping information maintained in said network switch, wherein said mapping information identifies a time slot in an outgoing set of time slots in said at least one outgoing set of time slots for each time slot in said set of time slots; and
   said network switch is configured to modify said mapping information in response to a failure of at least one link interface in said plurality of link interfaces.

2. The network switch according to claim 1, wherein said mapping information includes entries in a mapping table.

3. A network switch comprising:
   a plurality of link interfaces;
   a plurality of processing engines;
   a switch fabric coupled to said plurality of processing engines; and
   a switch coupling said plurality of link interfaces to said plurality of processing engines, wherein said switch is configured to:
   map data from at least one time slot in a set of time slots from a processing engine in said plurality of processing engines to at least one outgoing set of time slots; and
   forward each outgoing set of time slots in said at least one outgoing set of time slots to a link interface in said plurality of link interfaces,
   wherein said switch is configured to map data in response to mapping information maintained in said network switch, wherein said mapping information identifies a time slot in an outgoing set of time slots in said at least one outgoing set of time slots for each time slot in said set of time slots; and
   said network switch is configured to modify said mapping information in response to a failure of at least one link interface in said plurality of link interfaces.

4. The network switch according to claim 3, wherein said mapping information includes entries in a mapping table.

5. A network switch comprising:
   a plurality of link interfaces;
   a plurality of processing engines;
   a switch fabric coupled to said plurality of processing engines; and
   a switch coupling said plurality of link interfaces to said plurality of processing engines, wherein switch is configured to:
   map data from a first link interface in said plurality of link interfaces to multiple processing engines in said plurality of processing engines; and
   map data from multiple link interfaces in said plurality of link interfaces to a first processing engine in said plurality of processing engines,
   wherein said switch is configured to map data from a first link interface and map data from multiple link interfaces in response to mapping information maintained in said network switch, and
   said network switch is configured to modify said mapping information in response to a failure of at least one link interface in said plurality of link interfaces;
   wherein at least one processing engine in said plurality of processing engines receives data to be processed by said at least one processing engine according to a first protocol within a layer and data to be processed by said at least one processing engine according to a second protocol within said layer and said first protocol is different than said second protocol.

6. The network switch according to claim 5, wherein said mapping information includes entries in a mapping table.

7. The network switch according to claim 6, wherein said switch is configured to modify said mapping information including by:
   (1) modifying at least one Backup field value in said mapping table.

8. The network switch according to claim 5, wherein said switch is a switch from a group of switches consisting of a packet switch, a multiplexing switch, and a time slot interchange switch.

9. The network switch according to claim 5, wherein:
   said plurality of link interfaces includes at least twice as many link interfaces as a number of processing engines included in said plurality of processing engines;
   each link interface in said set of link interfaces has redundancy;
   each processing engine in said set of processing engines has redundancy; and
   no processing engine in said set of processing engines is idle.

10. A network switch comprising:
    a plurality of link interfaces;
    a plurality of processing engines;
    a switch fabric coupled to said plurality of processing engines; and
    a switch coupling said plurality of link interfaces to said plurality of processing engines, wherein said switch is configured to:
    map data from at least one time slot in a set of time slots from a link interface in said plurality of link interfaces to at least one outgoing set of time slots; and
    forward each outgoing set of time slots in said at least one outgoing set of time slots to a processing engine in said plurality of processing engines,
    wherein said switch is configured to map data in response to mapping information maintained in said network switch, wherein said mapping information identifies a time slot in an outgoing set of time slots in said at least one outgoing set of time slots for each time slot in said set of time slots; and
    said network switch is configured to modify said mapping information in response to a failure of at least one processing engine in said plurality of processing engines.

11. The network switch according to claim 10, wherein said mapping information includes entries in a mapping table.

12. A network switch comprising:
a plurality of link interfaces;
a plurality of processing engines;
a switch fabric coupled to said plurality of processing engines; and
a switch coupling said plurality of link interfaces to said plurality of processing engines, wherein said switch is configured to:
map data from at least one time slot in a set of time slots from a processing engine in said plurality of processing engines to at least one outgoing set of time slots; and
forward each outgoing set of time slots in said at least one outgoing set of time slots to a link interface in said plurality of link interfaces,
wherein said switch is configured to map data in response to mapping information maintained in said network switch, wherein said mapping information identifies a time slot in an outgoing set of time slots in said at least one outgoing set of time slots for each time slot in said set of time slots; and
said network switch is configured to modify said mapping information in response to a failure of at least one processing engine in said plurality of processing engines.

13. The network switch according to claim 12, wherein said mapping information includes entries in a mapping table.

14. A network switch comprising:
a plurality of link interfaces;
a plurality of processing engines;
a switch fabric coupled to said plurality of processing engines; and
a switch coupling said plurality of link interfaces to said plurality of processing engines, wherein said switch is configured to:
map data from a first link interface in said plurality of link interfaces to multiple processing engines in said plurality of processing engines; and
map data from multiple link interfaces in said plurality of link interfaces to a first processing engine in said plurality of processing engines,
wherein said switch is configured to map data from a first link interface and map data from multiple link interfaces in response to mapping information maintained in said network switch; and
said network switch is configured to modify said mapping information in response to a failure of at least one processing engine in said plurality of processing engines;
wherein at least one processing engine in said plurality of processing engines receives data to be processed by said at least one processing engine according to a first protocol within a layer and data to be processed by said at least one processing engine according to a second protocol within said layer and said first protocol is different than said second protocol.

15. The network switch according to claim 14, wherein said mapping information includes entries in a mapping table.

16. The network switch according to claim 15, wherein said switch is configured to modify said mapping information including by:
(1) modifying at least one Backup field value in said mapping table.

17. The network switch according to claim 14, wherein said switch is a switch from a group of switches consisting of a packet switch, a multiplexing switch, and a time slot interchange switch.

18. The network switch according to claim 14, wherein:
said plurality of link interfaces includes at least twice as many link interfaces as a number of processing engines included in said plurality of processing engines;
each link interface in said set of link interfaces has redundancy;
each processing engine in said set of processing engines has redundancy; and
no processing engine in said set of processing engines is idle.

19. A network switch comprising:
a plurality of link interfaces;
a plurality of processing engines;
a switch fabric coupled to said plurality of processing engines; and
a switch coupling said plurality of link interfaces to said plurality of processing engines, wherein said switch is configured to:
map data from a first link interface in said plurality of link interfaces to multiple processing engines in said plurality of processing engines;
map data from multiple link interfaces in said plurality of link interfaces to a first processing engine in said plurality of processing engines,
wherein said switch is configured to map data from a first link interface and map data from multiple link interfaces in response to mapping information maintained in said network switch; and
said network switch is configured to modify said mapping information, including modifying at least one Backup field value in said mapping table;
wherein at least one processing engine in said plurality of processing engines receives data to be processed by said at least one processing engine according to a first protocol within a layer and data to be processed by said at least one processing engine according to a second protocol within said layer and said first protocol is different than said second protocol.

20. The network switch according to claim 19, wherein said switch is configured to modify said mapping information in response to a utilization level of at least one link interface in said plurality of link interfaces.

21. The network switch according to claim 19, wherein said switch is configured to modify said mapping information in response to a failure of at least one link interface in said plurality of link interfaces.

22. The network switch according to claim 19, wherein said switch is configured to modify said mapping information in response to a utilization level of at least one processing engine in said plurality of processing engines.

23. The network switch according to claim 19, wherein said switch is configured to modify said mapping information in response to a failure of at least one processing engine in said plurality of processing engines.

24. The network switch according to claim 19, wherein said mapping information includes entries in a mapping table.

25. The network switch according to claim 19, wherein said switch is a switch from a group of switches consisting of a packet switch, a multiplexing switch, and a time slot interchange switch.

26. The network switch according to claim 19, wherein:
said plurality of link interfaces includes at least twice as many link interfaces as a number of processing engines included in said plurality of processing engines;
each link interface in said set of link interfaces has redundancy;

each processing engine in said set of processing engines has redundancy; and no processing engine in said set of processing engines is idle.

27. A network switch comprising:

a plurality of link interfaces;

a plurality of processing engines;

a switch fabric coupled to said plurality of processing engines; and a switch coupling said plurality of link interfaces to said plurality of processing engines, wherein said switch is configured to:

map data from a first link interface in said plurality of link interfaces to multiple processing engines in said plurality of processing engines; and map data from multiple link interfaces in said plurality of link interfaces to a first processing engine in said plurality of processing engines;

wherein said switch is configured to map data from a first link interface and map data from multiple link interfaces in response to mapping information maintained in said network switch; and wherein at least one processing engine in said plurality of processing engines receives data to be processed by said at least one processing engine according to a first protocol within a layer and data to be processed by said at least one processing engine according to a second protocol within said layer and said first protocol is different than said second protocol; and wherein:

said plurality of link interfaces includes at least twice as many link interfaces as a number of processing engines included in said plurality of processing engines;

each link interface in said set of link interfaces has redundancy;

each processing engine in said set of processing engines has redundancy; and no processing engine in said set of processing engines is idle.

28. The network switch according to claim 27, wherein said method includes the step of:

(c) modifying said mapping information.

29. The network switch according to claim 28, wherein said switch is configured to modify said mapping information in response to a utilization level of at least one link interface in said plurality of link interfaces.

30. The network switch according to claim 28, wherein said switch is configured to modify said mapping information in response to a failure of at least one link interface in said plurality of link interfaces.

31. The network switch according to claim 28, wherein said switch is configured to modify said mapping information in response to a utilization level of at least one processing engine in said plurality of processing engines.

32. The network switch according to claim 28, wherein said switch is configured to modify said mapping information in response to a failure of at least one processing engine in said plurality of processing engines.

33. The network switch according to claim 28, wherein said mapping information includes entries in a mapping table.

34. The network switch according to claim 28, wherein said switch is configured to modify said mapping information including by:

(1) modifying at least one Backup field value in said mapping table.

35. The network switch according to claim 27, wherein said switch is a switch from a group of switches consisting of a packet switch, a multiplexing switch, and a time slot interchange switch.

36. The network switch according to claim 5, wherein said first protocol is High-level Data Link Control ("HDLC"), Point-to-Point Protocol ("PPP"), Frame Relay, Asynchronous Transfer Mode ("ATM"), Gigabit Ethernet, or Internet Protocol ("IP"); and said second protocol is High-level Data Link Control ("HDLC"), Point-to-Point Protocol ("PPP"), Frame Relay, Asynchronous Transfer Mode ("ATM"), Gigabit Ethernet, or Internet Protocol ("IP").

37. The network switch according to claim 14, wherein said first protocol is High-level Data Link Control ("HDLC"), Point-to-Point Protocol ("PPP"), Frame Relay, Asynchronous Transfer Mode ("ATM"), Gigabit Ethernet, or Internet Protocol ("IP"); and said second protocol is High-level Data Link Control ("HDLC"), Point-to-Point Protocol ("PPP"), Frame Relay, Asynchronous Transfer Mode ("ATM"), Gigabit Ethernet, or Internet Protocol ("IP").

38. The network switch according to claim 27, wherein said first protocol is High-level Data Link Control ("HDLC"), Point-to-Point Protocol ("PPP"), Frame Relay, Asynchronous Transfer Mode ("ATM"), Gigabit Ethernet, or Internet Protocol ("IP"); and said second protocol is High-level Data Link Control ("HDLC"), Point-to-Point Protocol ("PPP"), Frame Relay, Asynchronous Transfer Mode ("ATM"), Gigabit Ethernet, or Internet Protocol ("IP").

* * * * *